| (12) | United States Patent | (10) Patent No.: | US 9,287,820 B2 |
|---|---|---|---|
| | Suzuki et al. | (45) Date of Patent: | Mar. 15, 2016 |

(54) MOTOR CONTROL DEVICE AND AIR CONDITIONER

(71) Applicant: Kabushiki Kaisha Toshiba, Minato-ku (JP)

(72) Inventors: Nobuyuki Suzuki, Yokohama (JP); Sari Maekawa, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/633,712

(22) Filed: Feb. 27, 2015

(65) Prior Publication Data

US 2015/0256117 A1    Sep. 10, 2015

(30) Foreign Application Priority Data

Mar. 6, 2014    (JP) .................. 2014-043891

(51) Int. Cl.
| G05B 11/28 | (2006.01) |
| H02P 27/08 | (2006.01) |
| F24F 5/00 | (2006.01) |
| F25B 49/02 | (2006.01) |
| F24F 1/00 | (2011.01) |

(52) U.S. Cl.
CPC ............. *H02P 27/085* (2013.01); *F24F 5/001* (2013.01); *F25B 49/022* (2013.01); *F24F 1/00* (2013.01)

(58) Field of Classification Search
CPC ....... H02P 27/08; H02P 21/146; H02P 6/002; H02P 6/185; F25B 13/00; F25B 2600/01; F25B 49/025
USPC ................ 318/400.1, 400.13, 400.17, 400.2, 318/400.26, 599
See application file for complete search history.

(56) References Cited

U.S. PATENT DOCUMENTS

| 8,159,161 | B2 * | 4/2012 | Tomigashi | H02P 6/183 318/400.01 |
|---|---|---|---|---|
| 8,541,971 | B2 * | 9/2013 | Sakai | H02P 9/009 318/400.02 |
| 8,547,041 | B2 * | 10/2013 | Furukawa | B60L 11/1803 318/400.02 |
| 8,674,652 | B2 * | 3/2014 | Maekawa | H02P 6/18 180/443 |
| 8,890,450 | B2 * | 11/2014 | Maekawa | H02P 21/0042 318/400.02 |
| 2014/0225543 | A1 | 8/2014 | Maekawa | |
| 2015/0075195 | A1 | 3/2015 | Suzuki | |

FOREIGN PATENT DOCUMENTS

| JP | 2012-70591 | 4/2012 |
|---|---|---|
| JP | 5178799 B2 | 4/2013 |

OTHER PUBLICATIONS

U.S. Appl. No. 14/471,391, filed Aug. 28, 2014, Nobuyuki Suzuki.

* cited by examiner

*Primary Examiner* — Bentsu Ro
(74) *Attorney, Agent, or Firm* — Oblon, McClelland, Maier & Neustadt, L.L.P.

(57) ABSTRACT

A motor control device includes a PWM signal generation unit configured to increase/decrease a duty in both directions of phase lag side and phase lead side regarding a first phase of three-phase PWM signal pattern. The PWM signal generation unit is configured to increase/decrease a duty in one of the directions of phase lag side and phase lead side regarding a second phase. The PWM signal generation unit is configured to increase/decrease a duty in a direction opposite to that of the second phase with reference to any phase of the carrier-wave period regarding a third phase. A timing point adjusting unit is configured to detect two-phase currents at timing points fixed in the carrier-wave period and to adjust a detection timing point so that the current is detectable at a variable timing point regarding at least one phase when the two-phase currents become undetectable at the fixed timing points.

8 Claims, 44 Drawing Sheets

| Ptn | 1 | |
|---|---|---|
| PWM pulse condition | U-phase pulse is not more than minimum width and U-phase pulse is larger than W-phase pulse | V-phase pulse is not less than maximum width and U-phase pulse is smaller than W-phase pulse |
| Current detection timing points and detection phase | minimum width<br>U+<br>V+<br>W+<br>↑　　　↑<br>V-phase　-U-phase<br>(variable)　(variable) | U+<br>V+<br>W+<br>↑　　　↑<br>V-phase　-U-phase<br>(variable)　(variable) |
| Ptn | 2 | |
| PWM pulse condition | U-phase pulse is not less than minimum width and V-phase pulse is smaller than W-phase pulse | W-phase pulse is not less than maximum width and U-phase pulse is smaller than V-phase pulse |
| Current detection timing points and detection phase | U+<br>V+<br>W+<br>↑　　　↑<br>-U-phase　W-phase<br>(variable)　(variable) | U+<br>V+<br>W+<br>↑　　　↑<br>-U-phase　W-phase<br>(variable)　(variable) |
| Ptn | 3 | |
| PWM pulse condition | V-phase pulse is not more than minimum width and U-phase pulse is larger than W-phase pulse | |
| Current detection timing points and detection phase | U+<br>V+<br>W+<br>↑　　　↑<br>U-phase　-V-phase<br>(variable)　(fixed) | |

FIG. 8A

| Ptn | | 4 | |
|---|---|---|---|
| PWM pulse condition | | V-phase pulse is not more than minimum width and U-phase pulse is smaller than W-phase pulse | W-phase pulse is not less than maximum width and U-phase pulse is larger than V-phase pulse |
| Current detection timing points and detection phase | | W-phase -V PHASE (variable)(fixed) | W-phase -V-phase (variable)(fixed) |
| Ptn | | 5 | |
| PWM pulse condition | | W-phase pulse is not more than minimum width and U-phase pulse is larger than V-phase pulse | |
| Current detection timing points and detection phase | | -W-phase U-phase (fixed) (variable) | |
| Ptn | | 6 | |
| PWM pulse condition | | W-phase pulse is not more than minimum width and U-phase pulse is smaller than V-phase pulse | V-phase pulse is not less than maximum width and U-phase pulse is larger than W-phase pulse |
| Current detection timing points and detection phase | | -W-phase V-phase (variable)(variable) | -W-phase V-phase (variable)(variable) |

FIG.8B

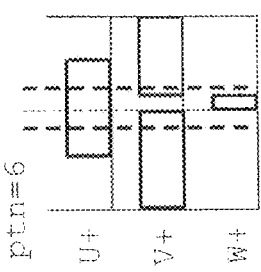
FIG. 16D
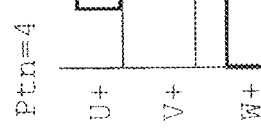
FIG. 16C
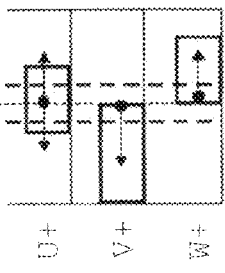
FIG. 16A
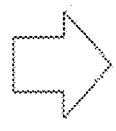
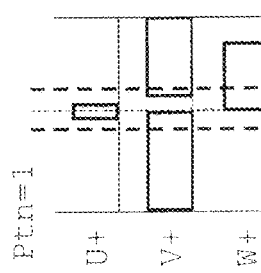
FIG. 16B

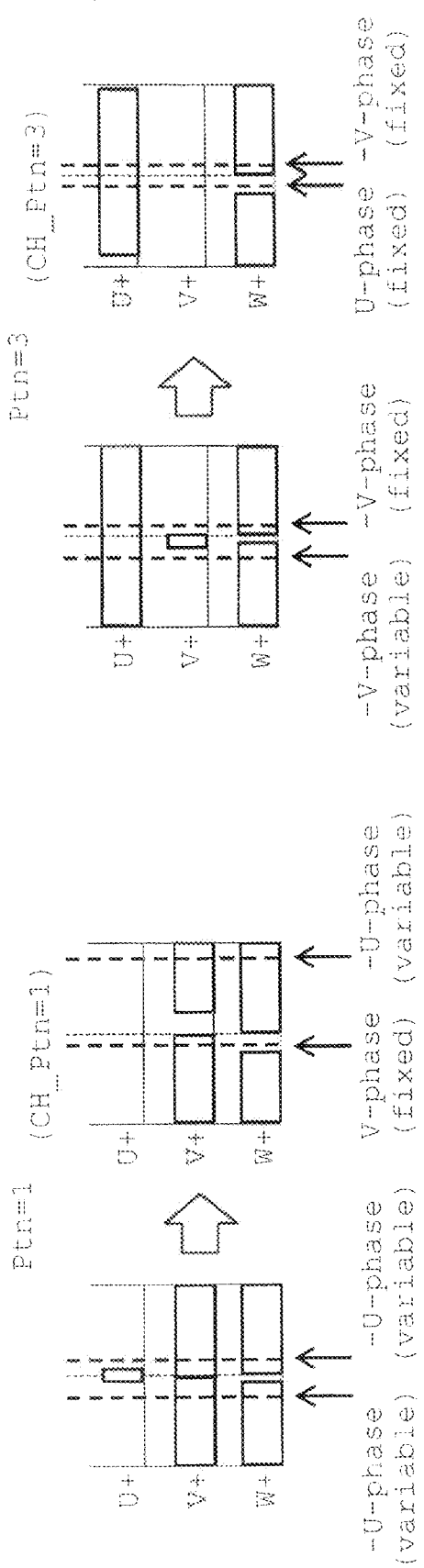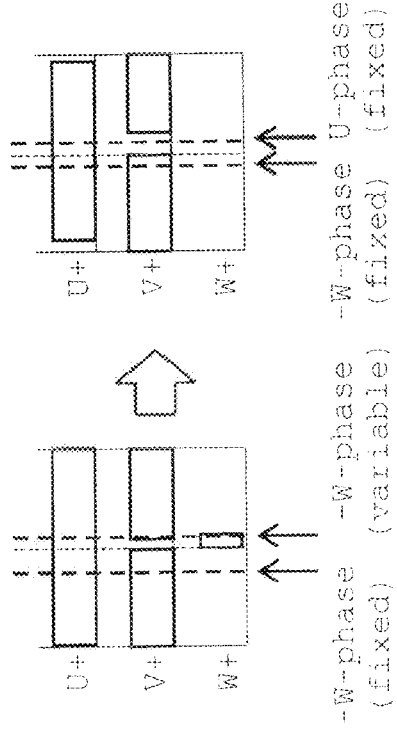
FIG. 19A
FIG. 19B
FIG. 19C

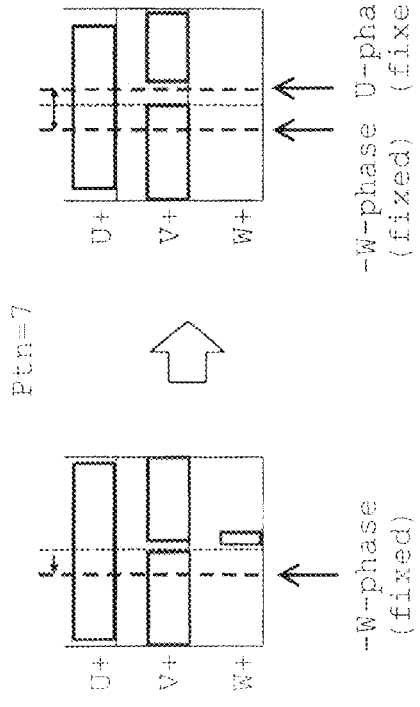
FIG. 20A
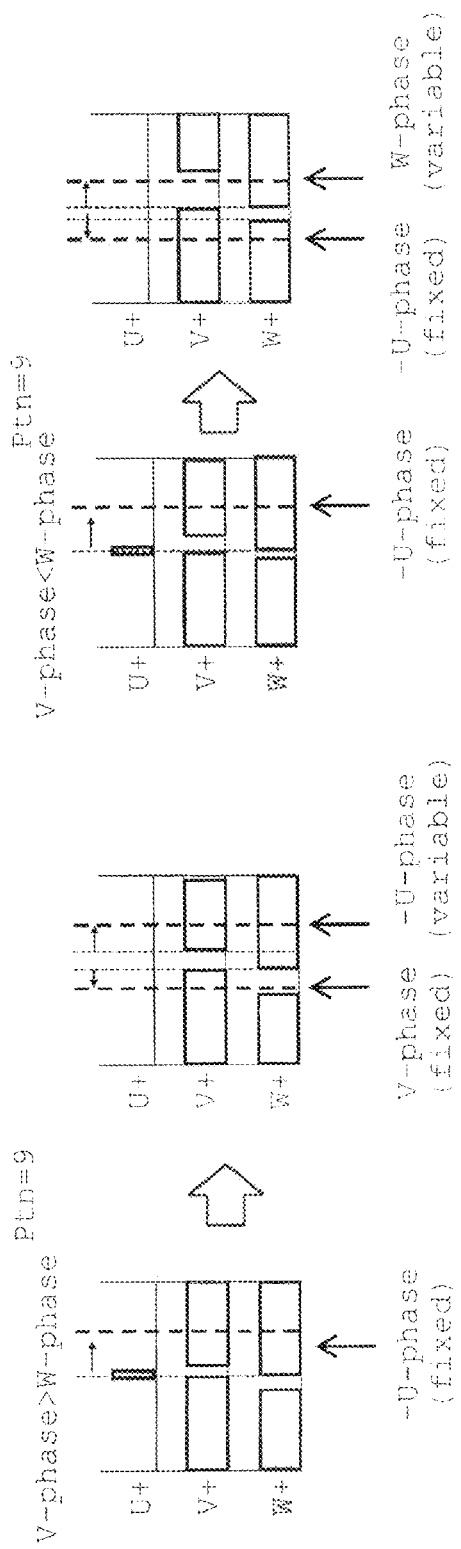
FIG. 20B
FIG. 20C

| Ptn | 0 | 9 | 10 |
|---|---|---|---|
| CH_Ptn | 0 | 9 | 10 |
| PWM pulse condition 1 | U-phase pulse is not less than maximum width and V-phase pulse is not less than maximum width | | |
| PWM pulse condition 2 | — | V-phase>W-phase | V-phase<W-phase |
| PWM pulse condition 3 | — | Minimum width > MAX*2-W-phase +V-phase | Minimum width > MAX*2-V-phase +U-phase |
| Current detection timing points and detection phase | −U-phase (fixed) | V-phase −U-phase −U-phase (fixed) (fixed) | V-phase −U-phase W-phase (fixed) (fixed) (variable) |

FIG. 30

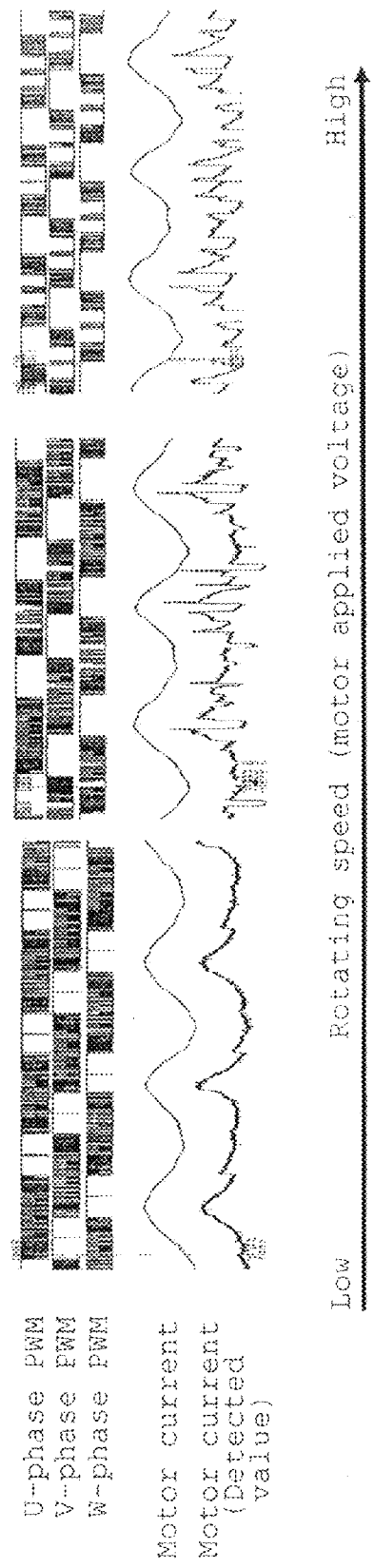
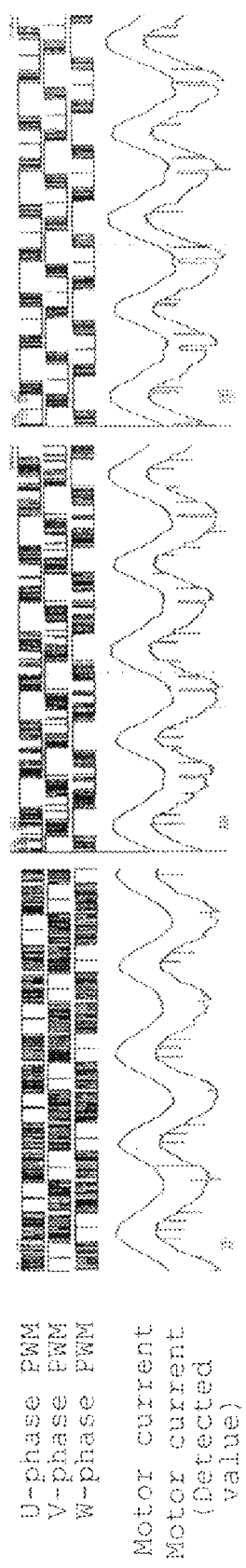
FIG. 32A
FIG. 32B

MOTOR CONTROL DEVICE AND AIR CONDITIONER

CROSS-REFERENCE TO RELATED APPLICATIONS

This application is based upon and claims the benefit of priority from the prior Japanese Patent Application No. 2014-043891 filed on Mar. 6, 2014, the entire contents of which are incorporated herein by reference.

FIELD

Embodiments described herein relate to a motor control device controlling an electric motor via an inverter circuit by PWM controlling a plurality of switching elements connected into a three-phase bridge configuration and an air conditioner provided with the motor control device.

BACKGROUND

A technique has conventionally been known that an electric current is detected using one shunt resistance inserted into a direct-current part of an inverter circuit when U-, V- and W-phase currents are detected for the purpose of controlling an electric motor. In order that all the three-phase currents may be detected in the above-mentioned manner, a three-phase PWM (pulse width modulation) signal pattern needs to be generated in one period of a PWM carrier so that two or more phase currents are detectable. For this purpose, a motor control device has been conventionally proposed which can normally detect two or more phase currents by shifting a phase of the PWM signal in one period of the PWM carrier, without increase in noise. See Japanese Patent No. 5178799, the contents of which are incorporated herein by reference.

However, the above-described conventional current detection manner results in a problem that only one phase current can be detected in two occurrences of current detection timing in a region where a modulation factor is increased.

BRIEF DESCRIPTION OF THE DRAWINGS

FIGS. 8A and 8B show examples (No. 1) of two-phase PWM pulse waveforms and current detection timing corresponding to patterns 1 to 9 divided by the processing of FIGS. 6 and 7 respectively;

FIGS. 16A to 16D are explanatory diagrams of a problem in the conventional art;

FIGS. 19A to 19C illustrate a second embodiment, showing a case where three-phase modulation PWM signals are changed to two-phase modulation PWM signals in patterns 1, 3 and 5;

FIGS. 20A to 20C are similar to FIGS. 19A to 19C, showing a case in patterns 7 and 9;

FIG. 30 is a view similar to FIG. 29 (No. 2);

FIGS. 32A and 32B show changes in current waveforms according to changes in motor speed in the conventional art and the embodiment respectively;

DETAILED DESCRIPTION

Figure 1:
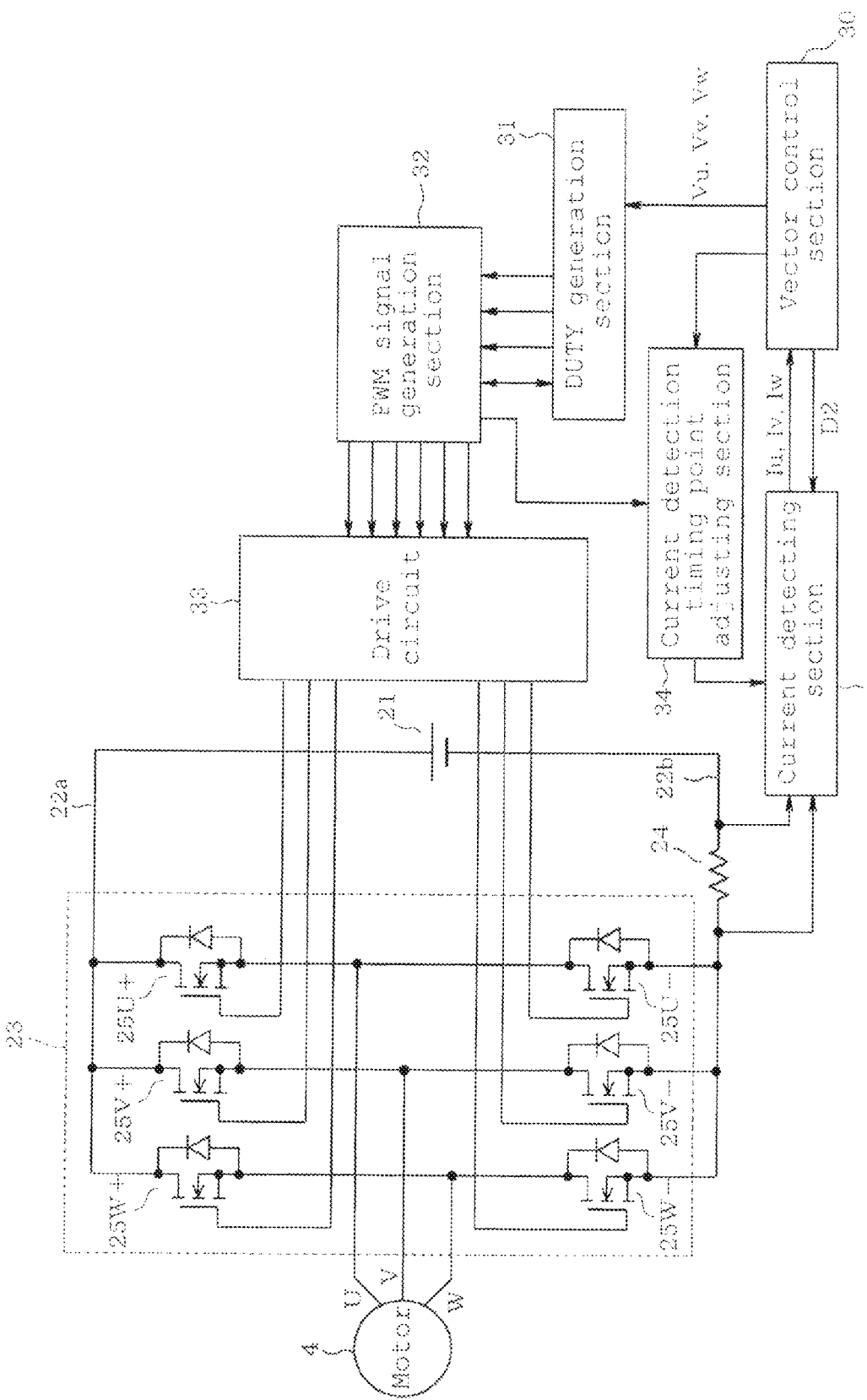
FIG. 1 is a functional block diagram showing an electrical arrangement of the motor control device of a first embodiment.

In general, according to one embodiment, a motor control device includes a current detecting element connected to a direct current side of an inverter circuit including a plurality of switching elements connected into a three-phase bridge configuration, the switching elements being configured to be on-off controlled according to a predetermined PWM signal pattern so that the inverter circuit converts direct current to three-phase alternating current, the current detecting element generating a signal corresponding to a current value. A rotor position determination unit is configured to determine a rotor position based on phase currents of an electric motor driven by the inverter circuit. A PWM signal generation unit is configured to generate a three-phase PWM signal pattern so that the pattern follows the rotor position. A current detection unit is configured to detect the phase currents based on a signal generated by the current detecting element and the PWM signal pattern. The PWM signal generation unit is configured to increase/decrease a duty in both directions of phase lag side and phase lead side with reference to any phase of the carrier-wave period regarding a first phase of the three-phase PWM signal pattern. The PWM signal generation unit is configured to increase/decrease a duty in one of the directions of phase lag side and phase lead side with reference to any phase of the carrier-wave period regarding a second phase of the three-phase PWM signal pattern. The PWM signal generation unit is configured to increase/decrease a duty in a direction opposite to the direction of the second phase with reference to any phase of the carrier-wave period regarding a third phase of the three-phase PWM signal pattern. The current detection unit has a timing point adjusting unit configured to detect two-phase currents at timing points fixed in the carrier-wave period of the PWM signal and to adjust a detection timing point so that the current is detectable at a variable timing point according to a magnitude of an output voltage supplied to the inverter circuit regarding at least one phase when the two-phase currents become undetectable at the fixed timing points.

A first embodiment will be described with reference to FIGS. 1 to 18B. The first embodiment is directed to an air conditioner employing a heat pump system and including a compressor motor. Referring to FIG. 2, a compressor (a load) 2 composing a heat pump system 1 includes a compression part 3 and an electric motor 4 both of which are housed in a single iron closed container 5. The motor 4 includes a rotor shaft connected to the compression part 3. The compressor 2, a four-way valve 6, an indoor heat exchanger 7, a decompressor 8 and an outdoor heat exchanger 9 are connected to one another by pipes serving as a heat-transfer medium flow passage into a closed loop. The compressor 2 is of a rotary type and the motor 4 is a three-phase IPM (interior permanent magnet) motor (a brushless DC motor, for example). An air conditioner E incorporates the above-described heat pump system 1.

The four-way valve 6 in a heating operation is shown by a solid line in FIG. 2. A high-temperature refrigerant compressed by the compression part 3 of the compressor 2 is supplied via the four-way valve 6 to the indoor heat exchanger 7 thereby to be condensed. The condensed refrigerant is subsequently decompressed by the decompressor 8 into the low-temperature refrigerant, flowing into the outdoor heat exchanger 9. The refrigerant is evaporated in the outdoor heat exchanger and returned to the compressor 2. On the other hand, the four-way valve 6 in a cooling operation is switched to the state as shown by broken line in FIG. 2. As a result, the high-temperature refrigerant compressed by the compression part 3 is supplied via the four-way valve 6 to the outdoor heat exchanger 9 to be condensed. The condensed refrigerant is subsequently decompressed by the decompressor 8 into the low-temperature refrigerant, flowing into the indoor heat exchanger 7. The refrigerant is evaporated in the indoor heat exchanger 7 and returned to the compressor 2. Fans 10 and 11 are driven to supply air into the indoor and outdoor heat exchangers 7 and 9 respectively. Heat exchange between the heat exchangers 7 and 9 and indoor air and outdoor air is efficiently carried out by the blowing operations of the fans 10 and 11.

Figure 2:
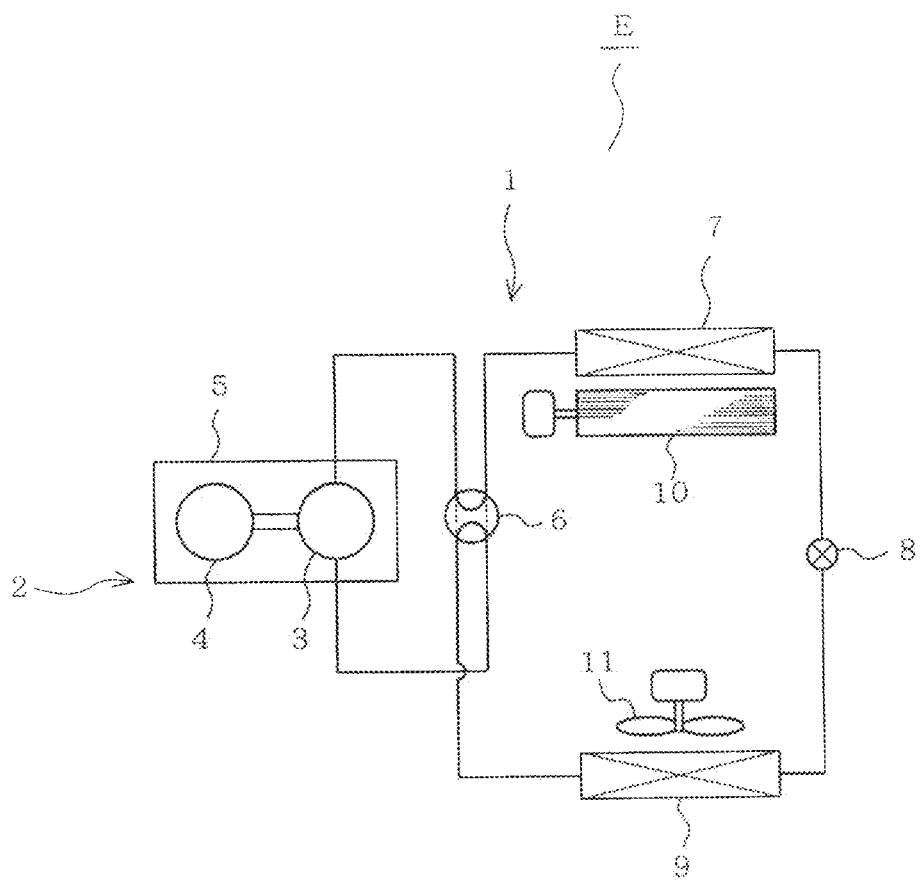
FIG. 2 is a schematic diagram showing an arrangement of heat pump system.

Referring to FIG. 1, a functional electrical arrangement of the motor control device is shown. Although a DC power supply 21 is designated by a symbol of DC power supply, the DC power supply 21 includes a rectifier circuit, a smoothing capacitor and the like when a DC power supply is generated from a commercial AC power supply. An inverter circuit (a DC-AC converter) 23 is connected via a positive bus bar 22$a$ and a negative bus bar 22$b$ to the DC power supply 21. A shunt resistance 24 serving as a current detecting element is inserted to the negative bus bar 22$b$ side. The inverter circuit 23 includes N-channel type power MOSFETs 25 (U+, V+, W+, U−, V−, W−) which serve as switching elements and are connected into a three-phase bridge configuration. Three-phase output terminals are connected to phase windings of the motor 4 respectively.

A terminal voltage (a signal corresponding to a current value) of the shunt resistance (the current detecting element) 24 is detected by a current detecting section 27 (a current detecting unit). When A/D converting and then reading the terminal voltage, the current detecting section 27 detects U-phase, V-phase and W-phase currents Iu, Iv and Iw based on a two-phase or three-phase PWM signal pattern delivered to the inverter circuit 3. The phase currents detected by the current detecting section 27 are supplied to a vector control section 30 (a rotor position determining unit and a PWM signal generating unit).

When supplied with a rotating speed command $\omega_{ref}$ of the motor 4 from a function section such as a microcomputer which sets control conditions, the vector control section 30 generates a torque current command $Iq_{ref}$, based on a difference between the rotating speed command $\omega_{ref}$ and an estimated actual rotating speed of the motor 4. A rotor position θ of the motor 4 depends upon the phase currents Iu, Iv and Iw of the motor 4. A torque current Iq and an excitation current $I_d$ are calculated by vector operation using the rotor position θ. A voltage command Vq is generated by proportional-integral (PI) control operation of the difference between the torque current command $Iq_{ref}$ and the torque current Iq, for example. A voltage command Vd is generated by the same processing as applied to the excitation current $I_d$. The voltage commands Vq and Vd are converted to three-phase voltages Vu, Vv and Vw using the rotor position θ. The three-phase voltages Vu, Vv and Vw are supplied to a DUTY generating section (a PWM signal generating unit) 31, so that duties U_DUTY, V_DUTY and W_DUTY to generate respective phase PWM signals are determined.

The three-phase duties U_DUTY, V_DUTY and W_DUTY are supplied to a PWM signal generation section (a PWM signal generation unit) 32 to be compared with a level of carrier, so that three-phase PWM signals are generated. Further, lower arm side signals are also generated by inverting the three-phase PWM signals. Dead time is added to the generated signals if necessary, and the signals are supplied to a drive circuit 33. According to the supplied PWM signals, the drive circuit 33 supplies gate signals to gates of the power MOSFETs 25 (U+, V+, W+, U−, V− and W−) composing the inverter circuit 23. Gate signals boosted by a necessary level are supplied to an upper arm side. A manner of the PWM signal generation section 32 generating the three-phase PWM signals is disclosed as a manner of a fourth embodiment in the above-mentioned Japanese Patent No. 5178799.

A current detection timing point adjusting section 34 is disposed between the PWM signal generation section 32 and the current detecting section 27. Based on the carrier supplied from the PWM signal generation section 32 and the information supplied from the vector control section 30, the current detection timing point adjusting section 34 determines timing points for the current detecting section 27 to detect two-phase currents within a carrier period, supplying the timing points to the current detecting section 27. The current detecting section 27 performs A/D conversion of the terminal voltage of the shunt resistance 24 at the timing points supplied from the current detection timing point adjusting section 34. In the foregoing description, functions of the configurations 27, 30 to 32 and 34 are realized by hardware and software of the microcomputer including a CPU.

Figure 3:
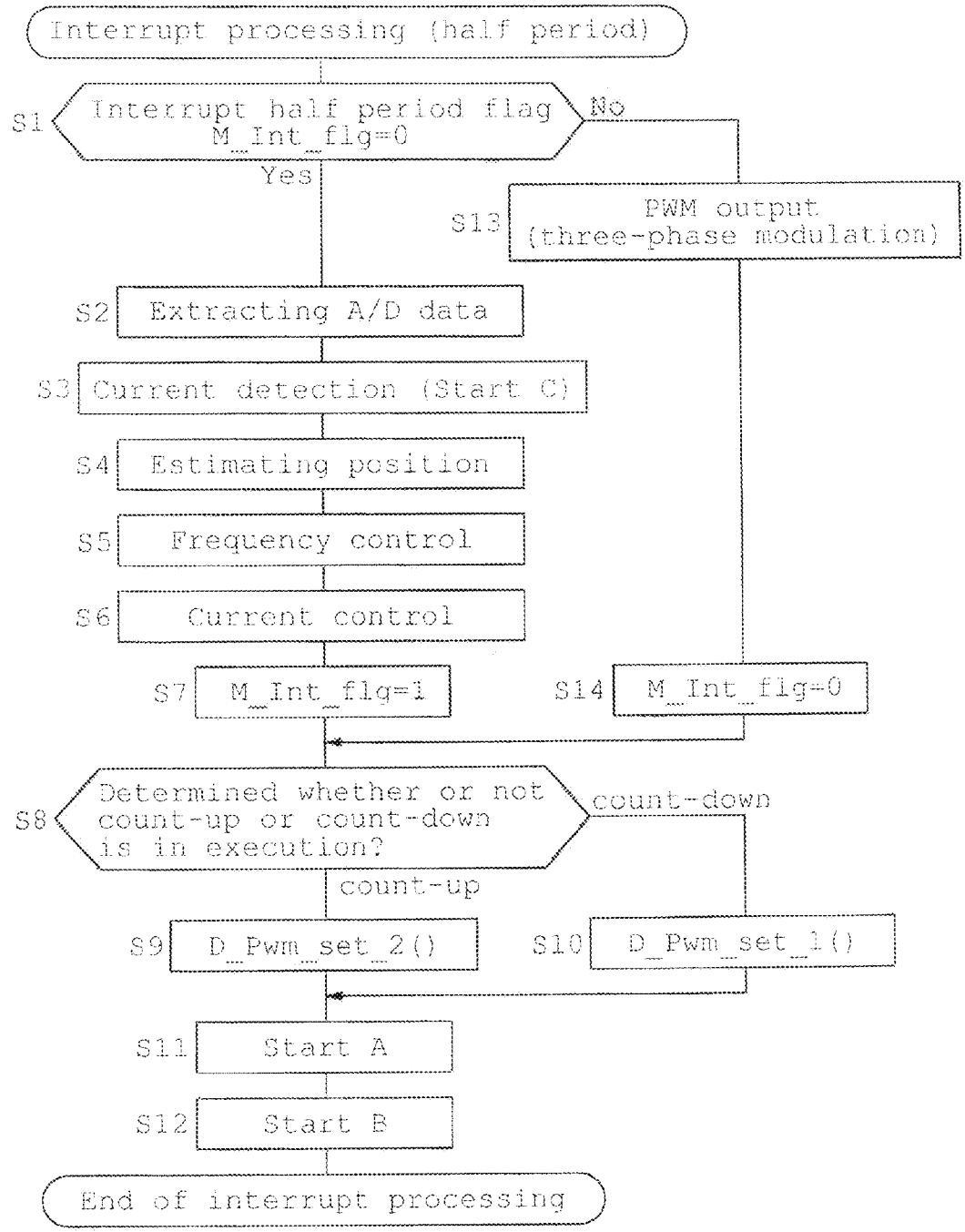
FIG. 3 is a flowchart showing interrupt processing executed at intervals of half period of the carrier.

The operation of the embodiment will now be described with reference to FIGS. 3 to 25. FIG. 3 shows interrupt processing executed in every half period of carrier. More specifically, PWM interrupt takes place at peak and bottom of a carrier or triangular amplitude. Firstly, it is determined whether or not the flag M_INT_flg=0 (reset; S1). When the flag is 0, data A/D converted in the current detecting section 27 is extracted (S2). Three-phase currents are detected based on the extracted data (S3). "Start C" processing which will be described later is executed at step S3.

A/D conversion of the terminal voltage of the shunt resistance 24 in the current detecting section 27 is executed twice within one carrier period independent of the processing shown in FIG. 3 (execution timing will be described later). The A/D converted data is stored in a register or the like. Accordingly, data stored in the register is read in the processing at step S2.

Subsequently, a rotor position (θ) of the motor 4 is estimated from the three-phase currents by a vector-controlled calculation (S4), and frequency control (speed control, S5) and current control (PI control or the like) are executed (S6). The flag M_Int_flg is set to 1 (S7). Processing at subsequent steps S8 to S11 is executed by the DUTY generating section 31. The DUTY generating section 31 refers to a value of a carrier counter supplied from the PWM signal generation section 32 to determine whether or not count-up or count-down is in execution (S8). When count-up is in execution, an index D_Pwm_set_2( ) is set (S9). When count-down is in execution, an index D_Pwm_set_1( ) is set (S10). These indexes will be described later with reference to FIGS. 4 and 5. Start A and start B are then executed (S11 and S12).

Further, when the flag M_Int_flg is set to 1 at step S1 (NO), three-phase PWM signals are supplied (S13) and the flag M_Int_flg is set to 0 (S14). The control sequence then proceeds to step S8.

FIGS. 4A and 4B show an execution time image of the interrupt processing together with the PWM carrier waveform. In the air conditioner, a single control circuit (microcomputer) controls an electric motor driving the fan 11 of the heat exchanger 9 corresponding to outdoor equipment in parallel with the compressor 2. An electric motor driving a fan 10 of the heat exchanger 7 corresponding to indoor equipment is controlled by another control circuit, driver IC or the like.

Figure 4:
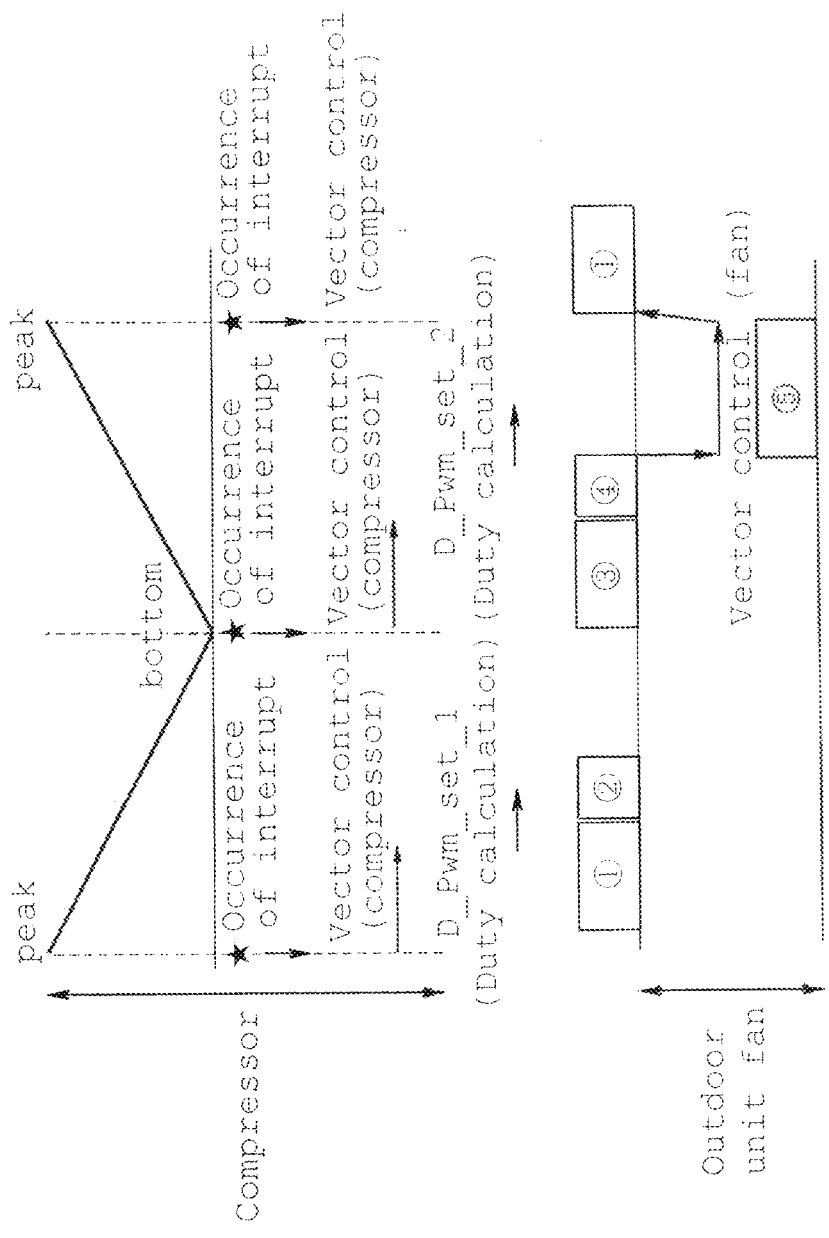
FIGS. 4A and 4B show lapse of execution time of the processing as shown in FIG. 3 together with a PWM carrier wave.

FIG. 4 shows, in part (a), processing times (1) to (4) regarding control of the motor of the compressor 2 as shown in FIG. 3 and, in part (b), a processing time (5) regarding control of the motor (fan motor) of the above-described fan 11. More specifically, when the PWM interrupt takes place at the bottom of the triangular wave amplitude, motor current is detected and vector control is carried out regarding the fan motor after execution of the processing shown in FIG. 3. FIGS. 4A and 4B show processes (1) to (4) designated by encircled numbers. Processes (1) and (3) correspond to steps S2 to S8, and processes (2) and (4) correspond to steps S9 and S10 respectively. In this case, the fan motor control (5) is carried out after execution of process (4).

Figure 5:
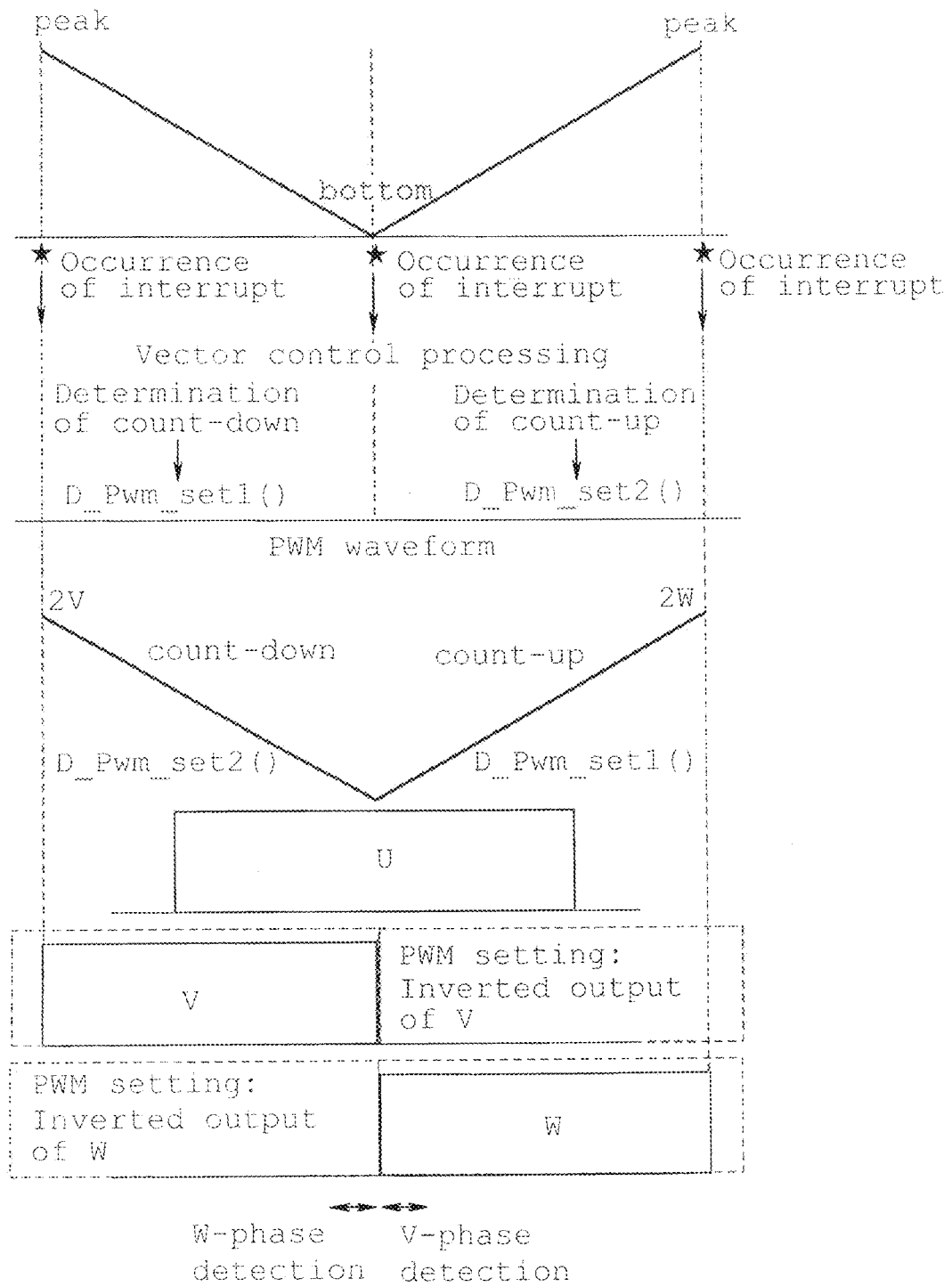
FIG. 5 shows an output phase of three-phase PWM duty pulse.

FIG. 5 shows output phases of respective phase PWM duty pulses. The term, "duty" will sometimes be used to mean "duty pulse" in the following description. A control manner as disclosed by Japanese Patent No. 5178799, the contents of which are incorporated herein by reference, is employed as described above. More specifically, regarding a first one of three phases, the duty is increased/decreased in both directions of phase lag side and phase lead side with reference to the bottom of the triangular wave amplitude. Regarding a second phase, the duty is increased/decreased, for example, to the phase lead side with reference to the aforesaid bottom. Regarding a third phase, the duty is increased/decreased to the phase lag side with reference to the aforesaid bottom. Although the first, second and third phases correspond to U, V and W phases respectively in the example, the correspondence relationship is optional. The carrier counter is under a count-down operation when an interrupt takes place at a peak of the triangular wave amplitude. As a result, duty pulses for a first half of the current carrier period are output by D_Pwm_set_2( ). Duty values of the U, V and W phases are obtained by doubling the duty values calculated by vector control.

Regarding the U phase, pulses of half duty are delivered in a period starting from the time after the interrupt at the peak of the triangular wave amplitude to the bottom. Regarding the V phase, when duty is less than 50%, the pulses are output in a period starting from the time after the interrupt at the peak of the triangular wave amplitude to the bottom in the same manner with respect to the U phase. Further, regarding the W phase, when duty exceeds 50%, pulses of an excess are supplied in a period starting from the timing of interrupt at the peak to the bottom. Accordingly, these pulses are output by D_Pwm_set_2( ).

On the other hand, the carrier counter is under a count-up operation when an interrupt takes place at a bottom of the triangular wave amplitude. As a result, duty pulses for a latter half of the current carrier period are output by D_Pwm_set_1( ). Regarding the U phase, pulses of half duty are output in a period starting from the time after the interrupt at the bottom of the triangular wave amplitude to the peak in the same manner as in the first half period. Regarding the V phase, when duty exceeds 50%, the pulses corresponding to the excess are output in a period starting from the time after the interrupt at the bottom of the triangular wave amplitude to the peak. Further, regarding the W phase, when duty is less than 50%, pulses are output in a period starting from the timing of interrupt at the bottom to the peak. Accordingly, these pulses are output by D_Pwm_set_1( ).

Next, processing (Start A) at step S11 will be described with reference to FIGS. 6 and 7. In the processing, three-phase duty pulses are divided into patterns (0) to (9) depending upon a magnitude relation of respective phase duty pulses in the three-phase modulated PWM signals. These patterns will be shown as variables Ptns in the processing which will be described later. The pattern division is based on the following conditions.

In the current detecting section 27, a minimum duty refers to a current-detectable minimum duty, and a maximum width refers to a result of subtraction of the minimum width from maximum duty (100%). For example, when the current-detectable minimum time is 10 μs and the carrier frequency is 4 kHz, the minimum width is set to 4% and the maximum width is set to 96%. A three-phase PWM signal output pattern is divided into the following combinations of U-, V- and W-phase duties:

(1) a case where the U-phase is less than the minimum width, and the V-phase is larger than the W-phase or equal to or larger than the maximum width, and the W-phase is larger than the U-phase;

(2) a case where the U-phase is less than the minimum width, and the W-phase is larger than the V-phase or equal to or larger than the maximum width, and the V-phase is larger than the U-phase;

(3) a case where the V-phase is less than the minimum width, and the U-phase is larger than the W-phase;

(4) a case where the V-phase is less than the minimum width, and the W-phase is larger than the U-phase or equal to or larger than the maximum width, and the U-phase is larger than the V-phase;

(5) a case where the W-phase is less than the minimum width and the U-phase is larger than the V-phase;

(6) a case where the W-phase is less than the minimum width, and the V-phase is larger than the U-phase or equal to or larger than the maximum width, and the W-phase is smaller than the U-phase;

(7) a case where the U-phase and the V-phase are equal to or larger than the maximum width;

(8) a case where the U-phase and the W-phase are equal to or larger than the maximum width;

(9) a case where the V-phase and the W-phase are equal to or larger than the maximum width; and (0) any case other than the cases (1) to (9).

Figure 6:
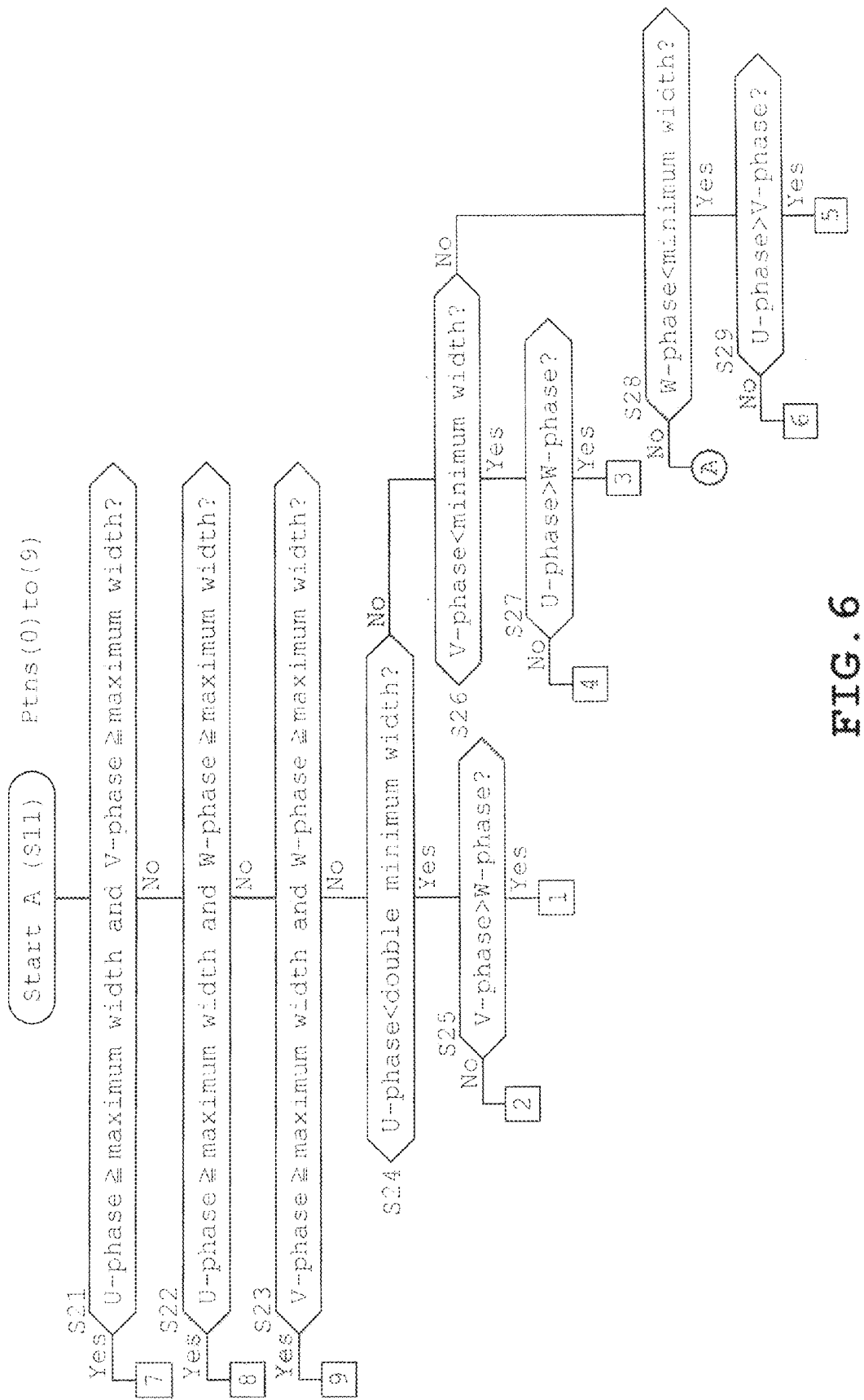
FIG. 6 is a flowchart (No. 1) showing contents of processing at step S11 in FIG. 3.
Figure 7:
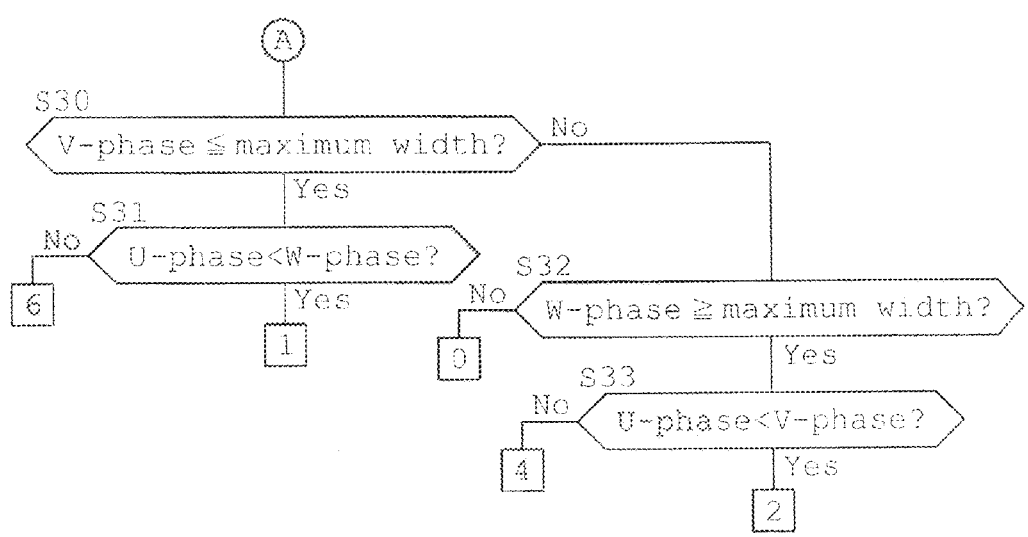
FIG. 7 is also a flowchart (No. 2) showing contents of processing at step S11 in FIG. 3.
Figure 9:
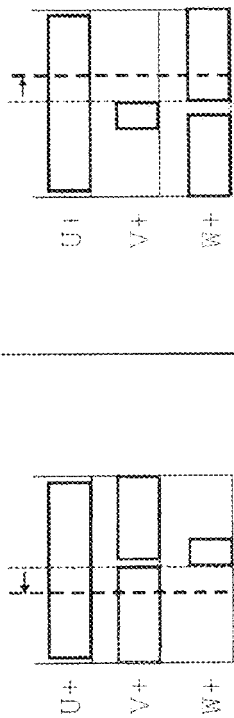
FIG. 9 also shows examples (No. 2) of two-phase PWM pulse waveforms and current detection timing points corresponding to patterns 1 to 9 divided by the processing of FIGS. 6 and 7 respectively.
Figure 10:
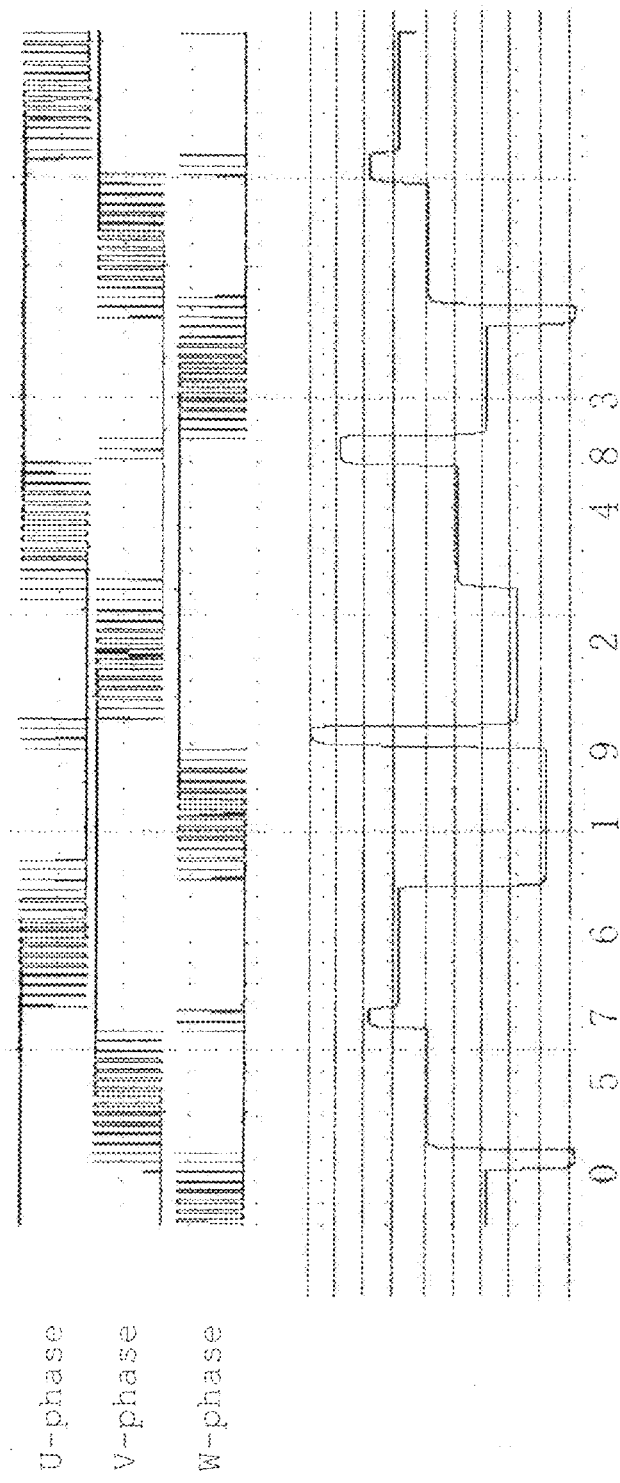
FIG. 10 shows three-phase PWM signal waveforms and shifts in the patterns (0 to 9)

At steps S21 to S33 shown in FIGS. 6 and 7, patterns (variables Ptns) (0) to (9) are distinguished according to the above-described conditions. FIGS. 8 and 9 show three-phase PWM signal patterns corresponding to the aforementioned patterns (1) to (9). FIG. 10 show changes in the patterns (0) to (9) according to actual changes in the three-phase PWM signal pattern.

Figure 11:
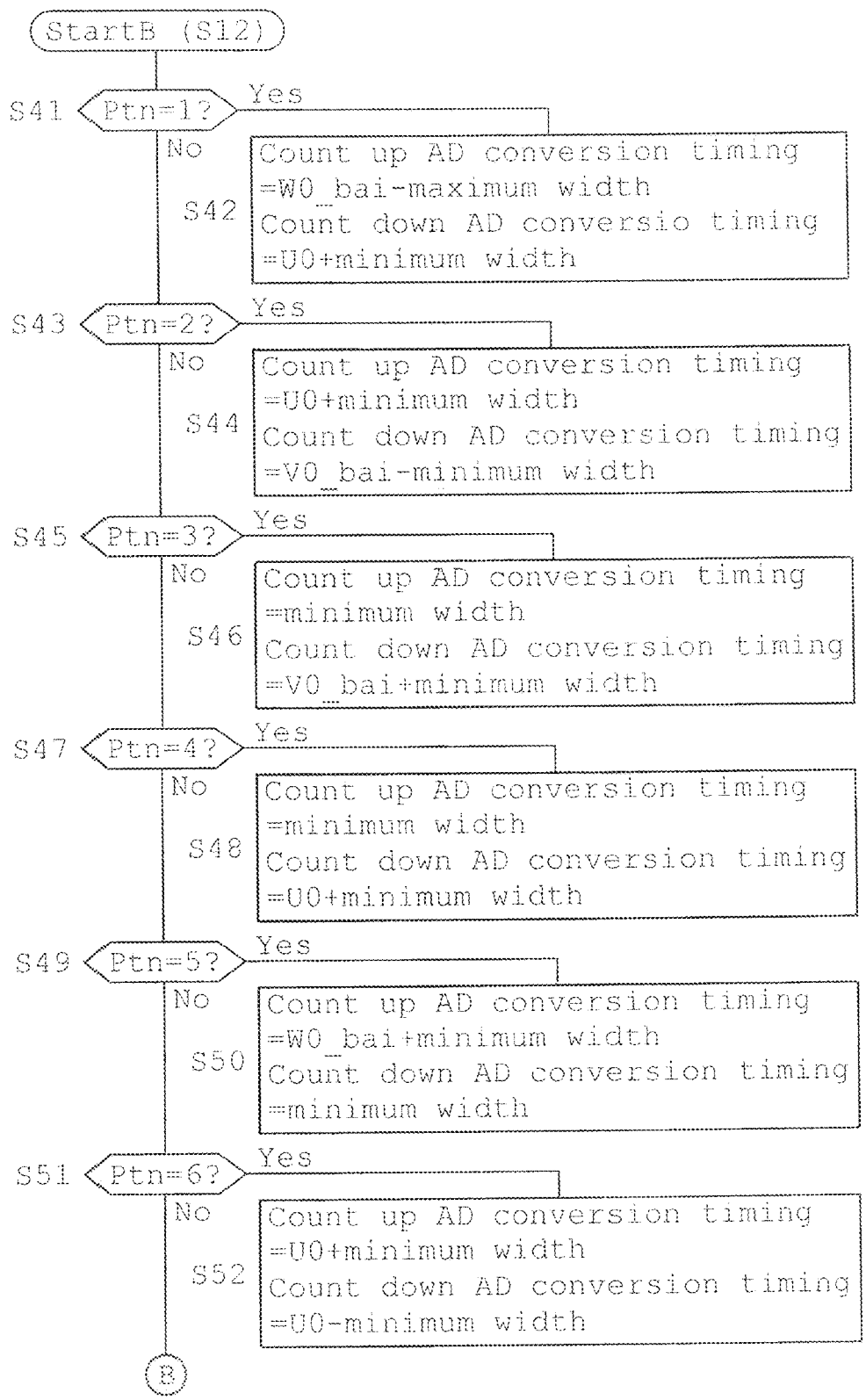
FIG. 11 is a flowchart (No. 1) showing contents of processing at step S12 in FIG. 3.
Figure 12:
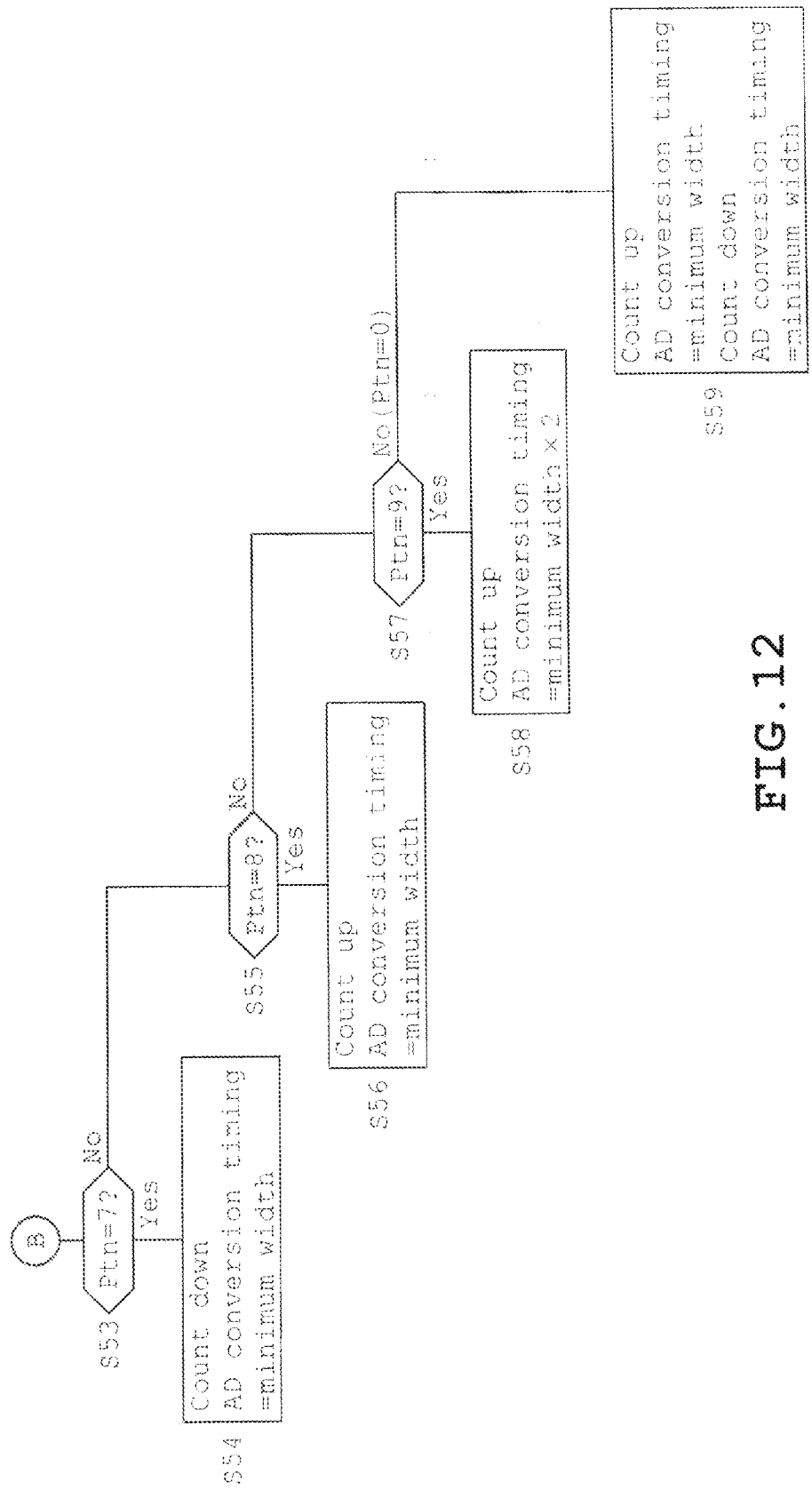
FIG. 12 is a flowchart (No. 2) showing contents of processing at step S12 in FIG. 3.

FIGS. 11 and 12 show the processing (Start B) at step S12 in more detail. In the processing, the current detecting section 27 determines timing points for A/D conversion of the terminal voltage of the shunt resistance 24 within the carrier period. The timing points for A/D conversion are determined with respect to each one of a count-down period from the peak of carrier period to a half period (the bottom) and an upcount period from the half period to an end of the period. The former serves as a first detection timing point and the latter serves as a second detection timing point.

Figure 13B:
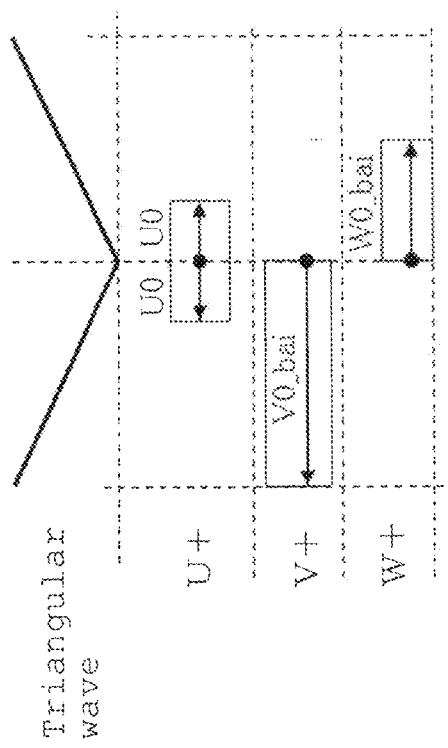
FIGS. 13A and 13B show definitions of U0, V0 and W0 and V0_bai and W0_bai.
Figure 13A:
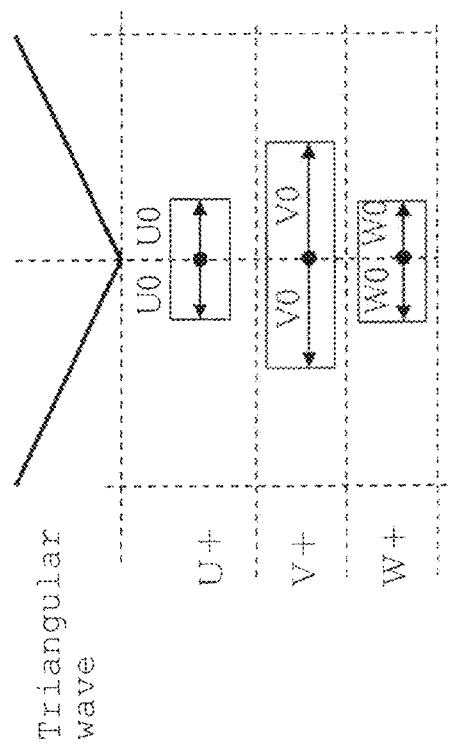

Symbols U0, V0 and W0 in FIG. 11 designate time periods corresponding to one halves of U-, V- and W-phase duties initially determined with the midpoint (bottom) of the carrier period serving as a base point, as shown in FIG. 13A. Symbols V0_bai, W0_bai in FIG. 13B correspond to pulse lengths extending with the midpoint of the carrier period serving a midpoint when V-phase and W-phase duty pulse are shifted in order that three-phase PWM signals may be output in the patterns as shown in FIG. 5.

Figure 14:
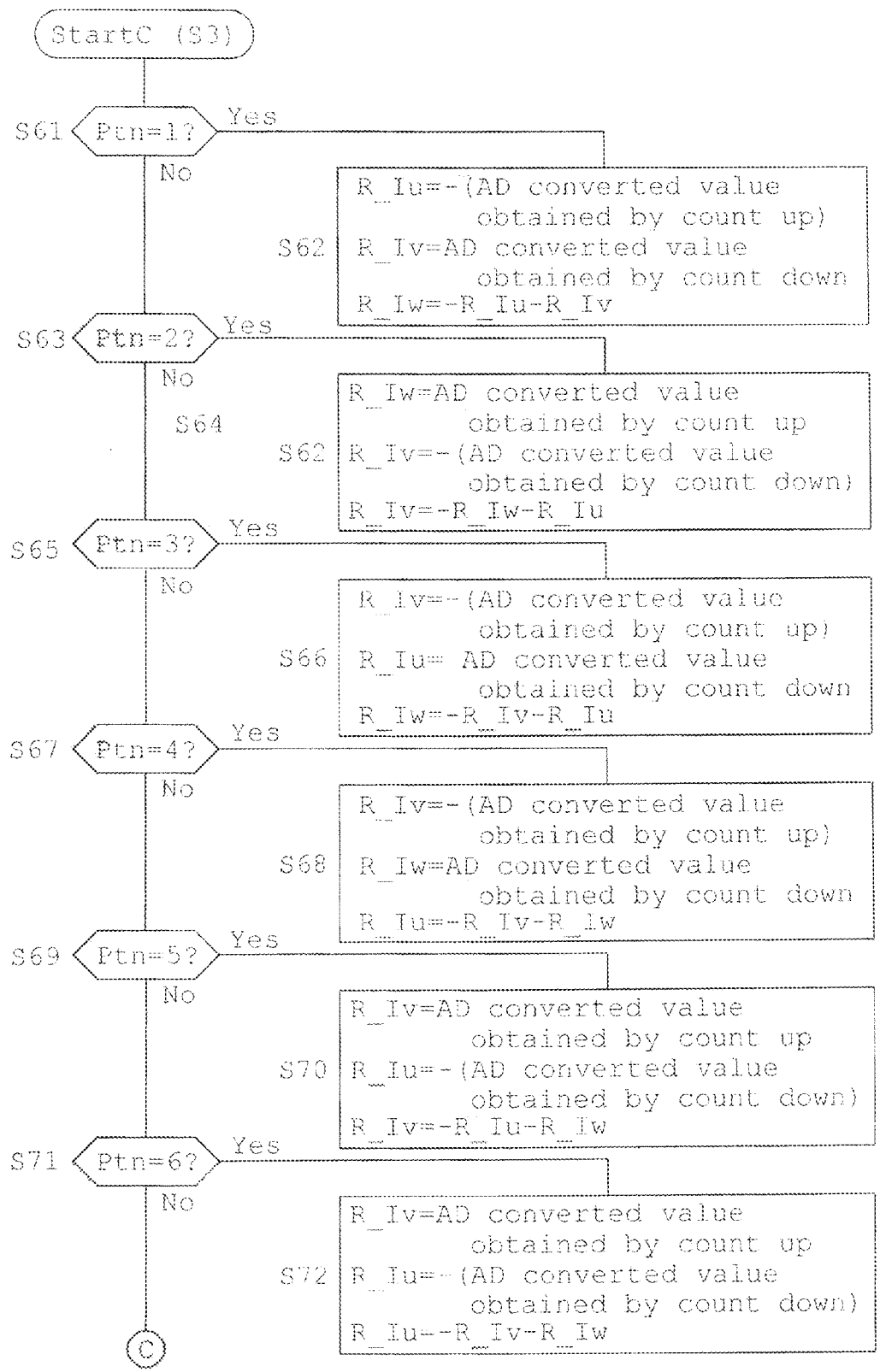
FIG. 14 is a flowchart (No. 1) showing contents of processing at step S3 in FIG. 3.
Figure 15:
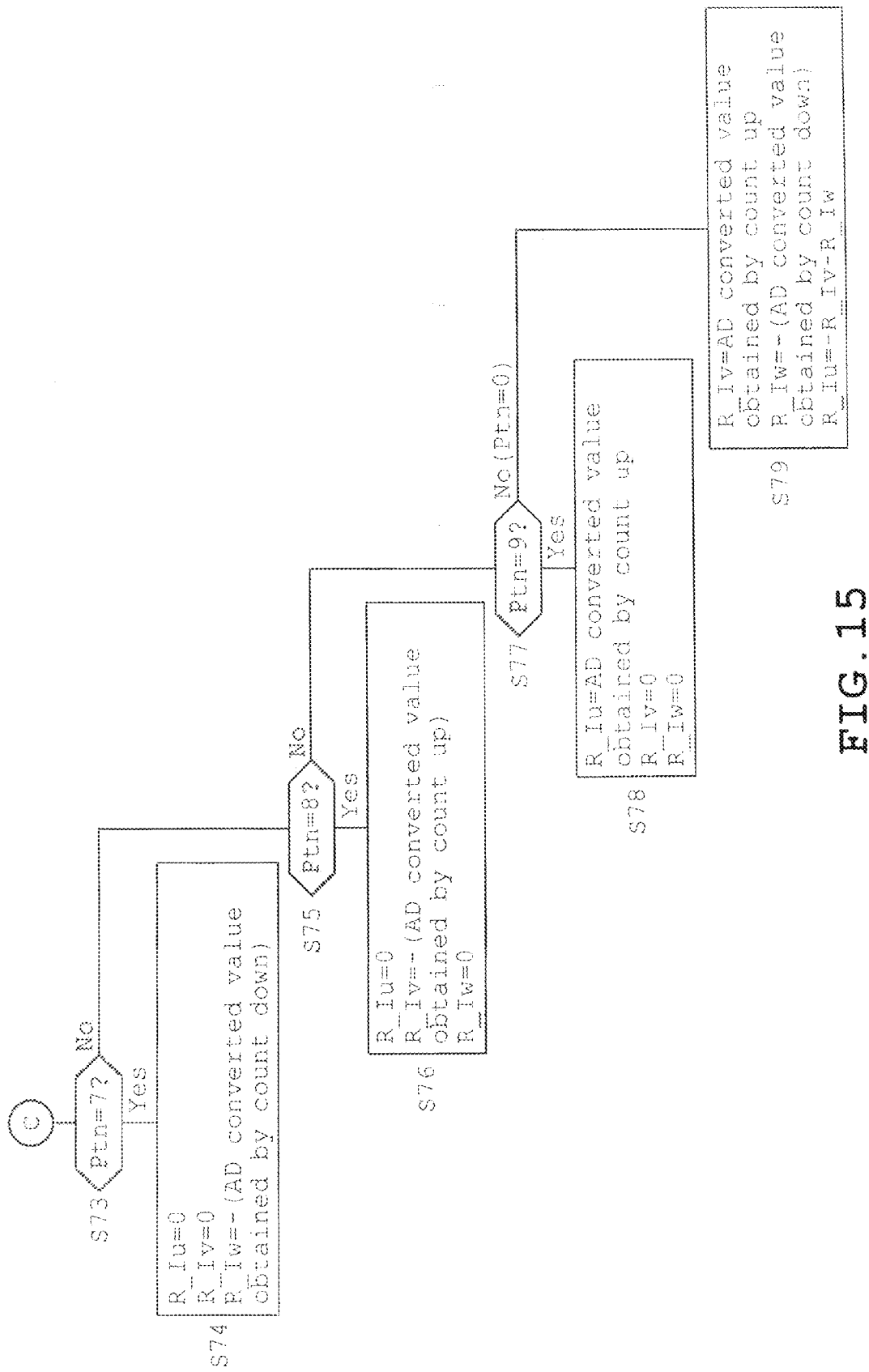
FIG. 15 is a flowchart (No. 2) showing contents of processing at step S3 in FIG. 3.

FIGS. 14 and 15 show the processing (Start C) at step S3 in more detail. In the processing, the current detecting section 27 performs an A/D conversion of two of three phases according to the patterns (0) to (9). It is further shown whether or not the other phase is obtained by calculation.

FIGS. 8 and 9 show timing points of A/D conversion and current phases detected by the A/D conversion for every one of patterns (0) to (9).

<Pattern 1>→Steps S42 and S62

A first detection timing point is set to (U0+minimum width (variable)) and serves to detect a V-phase current.

A second detection timing point is set to (W0_bai−minimum width (variable)) and serves to detect a U-phase current (negative).

At step S62, an A/D converted value (an AD value) of the U-phase with a minus sign (−) is substituted for the variable R_Iu and an A/D converted value (an AD value) of the V-phase is substituted for the variable R_Iv. A W-phase current R_Iw is obtained by R_Iw=−R_Iu−R_Iv.

The advantageous effects of the foregoing operation will be described with reference to FIGS. 16A to 16D and 17A to 17C. When the three-phase PWM pulses have respective intermediate widths as in Japanese Patent No. 518799 shown in FIG. 16A, two-phase currents (W-phase and V-phase both negative) can be detected at two fixed timing points respectively. When the motor 4 gets into a state of pattern (1) with the timing points being maintained, a V-phase current is detected at the first timing point and a U-phase current (negative) is detected at the second timing point, as shown in FIG. 16B. Accordingly, a detection phase in this case differs from that in the case as shown in FIG. 16A.

Figure 17A:
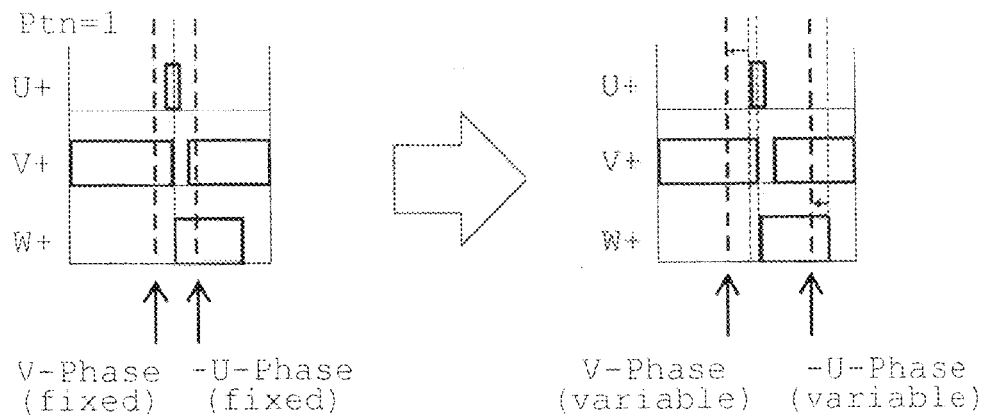
FIGS. 17A to 17C are explanatory diagrams of operation and effect of the embodiment.

In view of the foregoing, both of first and second timing points are rendered variable regarding pattern (1) as shown in FIG. 17A. The detection phase as shown in FIG. 17A is the same as in the case where the detection timing points are fixed. However, the detection timing points are rendered variable in order that the detection phase may be aligned with the V-phase and the U-phase (negative) in consideration with the other case of pattern (1) as shown in FIG. 8A.

<Pattern (2)>→Steps S44 and S64

The first detection timing point is set to (V0_bai−minimum width (variable)) and serves to detect the U-phase current (negative).

The second detection timing point is set to (U0+minimum width (variable)) and serves to detect the W phase current.

At step S64, an A/D converted value of the U-phase with a minus sign (−) is substituted for the variable R_Iu and an A/D converted value of the W-phase is substituted for a W-phase current R_Iw. A V-phase current R_Iv is obtained by R_Iv=−R_Iw−R_Iu.

<Pattern (3)>→Steps S46 and S66

The first detection timing point is set to (V0_bai+minimum width (variable)) and serves to detect the U-phase current.

The second detection timing point is set to the minimum width (fixed) and serves to detect the V-phase current (negative).

At step S66, an A/D converted value of the V-phase with a minus sign (−) is substituted for the variable R_Iv and an A/D converted value of the U-phase is substituted for a U-phase current R_Iu. A W-phase current R_Iw is obtained by R_Iw=−R_Iv−R_Iu.

<Pattern (4)>→Steps S48 and S68

The first detection timing point is set to (U0+minimum width (variable)) and serves to detect the W-phase current.

The second detection timing point is set to the minimum width (fixed) and serves to detect the V-phase current (negative).

At step S68, an A/D converted value of the V-phase with a minus sign (−) is substituted for the variable R_Iv and an A/D converted value of the W-phase is substituted for a variable R_Iw. A U-phase current R_Iu is obtained by R_Iu=−R_Iv−R_Iw.

Figure 17B:
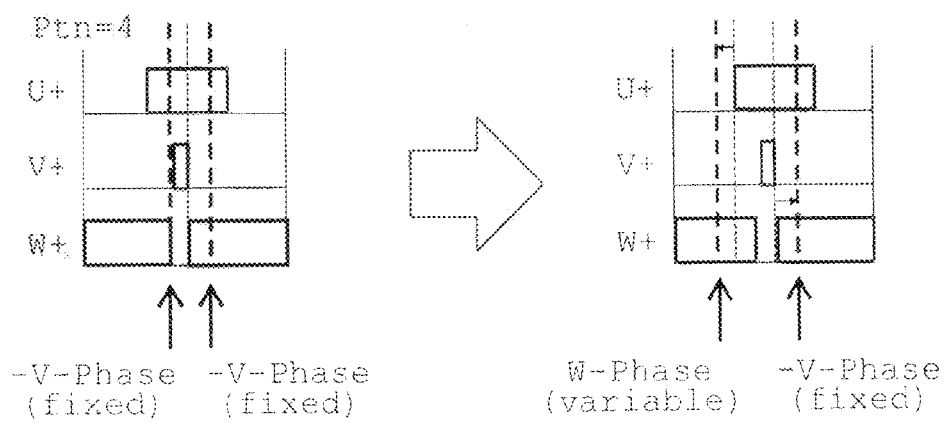

Since both detection timing points are fixed in pattern (4), the V-phase current (negative) is detected at both detection timing points, as shown in FIG. 17B. In view of this, the first detection timing point is rendered variable, so that the W-phase current is detected at the first detection timing point.
<Pattern 5>→Steps S50 and S70

The first detection timing point is set to the minimum width (fixed) and serves to detect the W-phase current (negative).

The second detection timing point is set to (W0_bai+minimum width (variable)) and serves to detect a U-phase current.

At step S70, an A/D converted value of the U-phase is substituted for the variable R_Iu and an A/D converted value of the W-phase with a minus sign (−) is substituted for the variable R_Iw. A V-phase current R_Iv is obtained by R_Iv=−R_Iu−R_Iw.
<Pattern (6)>→S52 and S72

The first detection timing point is set to (U0−minimum width (variable) and serves to detect the W-phase current (negative).

The second detection timing point is set to (U0+minimum width (variable)) and serves to detect a V-phase current.

At step S72, an A/D converted value of the V-phase is substituted for the variable R_Iv and an A/D converted value of the W-phase with a minus sign (−) is substituted for the variable R_Iw. A U-phase current R_Iu is obtained by R_Iu=−R_Iv−R_Iw.

Figure 17C:
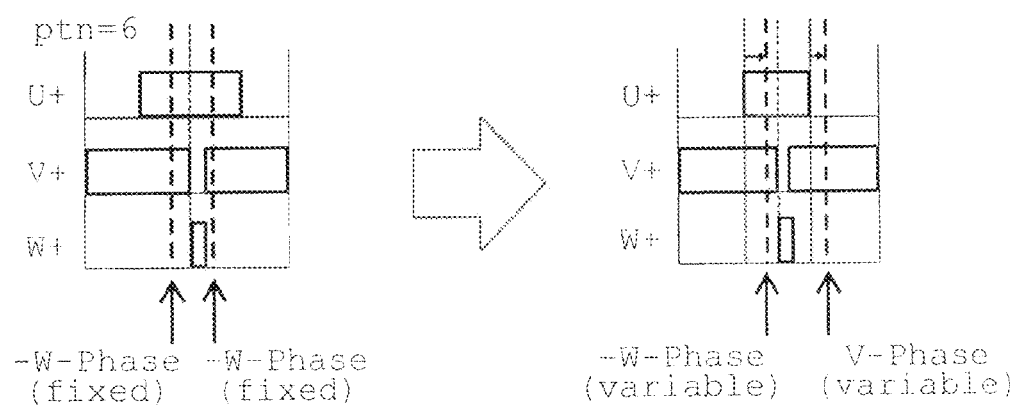

Since both detection timing points are fixed in pattern (6), the W-phase current (negative) is detected at both detection timing points, as shown in FIG. 17C. In view of this, the first and second detection timing points are rendered variable, so that the V-phase current is detected at the second side.

The following patterns (7) to (9) are directed to detection of a single phase current.
<Pattern (7)>→Steps S54 and S74

The first detection timing point is set to the minimum width (fixed) and serves to detect a W-phase current (negative).

The second detection timing point is not set since a second phase current cannot be detected in this case.

Accordingly, at step S74, 0 is substituted for both variables R_Iu and R_Iv and an A/D converted value of the W-phase with a minus sign is substituted for the variable R_Iw.
<Pattern (8)>→Steps S56 and S76

The first detection timing point is not detected since a first phase current cannot be detected.

The second detection timing point is set to the minimum width (fixed) and serves to detect a V-phase current (negative).

Accordingly, at step S76, 0 is substituted for both variables R_Iu and R_Iw, and an A/D converted value of the V-phase with a minus sign is substituted for the variable R_Iv.
<Pattern (9)>→Steps S58 and S78

The first detection timing point is not set since a first phase current cannot be detected in this case.

The second detection timing point is set to twice the minimum width (fixed) and serves to detect a U-phase current (negative). Accordingly, at step S78, 0 is substituted for both variables R_Iv and R_Iw, and an A/D converted value of the U-phase with a minus sign is substituted for the variable R_Iu.

Setting the second detection timing point to twice the minimum width differs from a fixed timing point set to another minimum width. However, the appended claims define "a variable timing point according to a magnitude of output voltage supplied to the inverter circuit." In light of the definition, setting to twice the minimum width does not fall within the notion of "variable" and is accordingly determined as "fixed."
<Pattern (0)>→Steps S59 and S79

The first detection timing point is set to the minimum width (fixed) and serves to detect a V-phase current (negative).

The second detection timing point is set to the minimum width (fixed) and serves to detect a W-phase current (negative). See FIG. 16A. At step S79, an A/D converted value of the V-phase with a minus sign is substituted for the variable R_Iv, and an A/D converted value of the W-phase with a minus sign is substituted for variable R_Iw. A U-phase current R_Iu is obtained by R_Iu=−R_Iv−R_Iw.

Figure 18A:
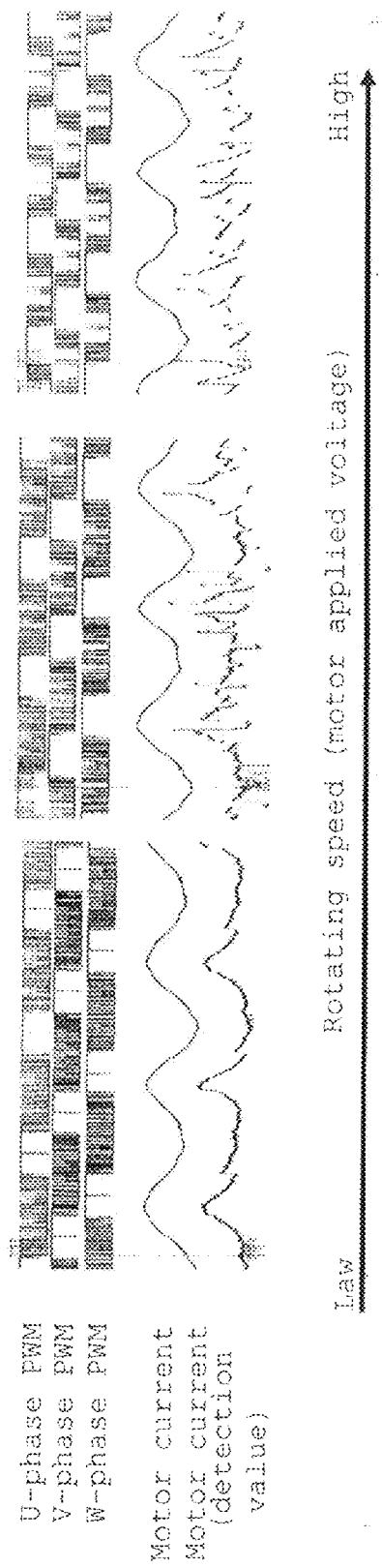
FIGS. 18A and 18B show changes in current waveforms according to changes in motor speed in the conventional art and the embodiment.
Figure 18B:
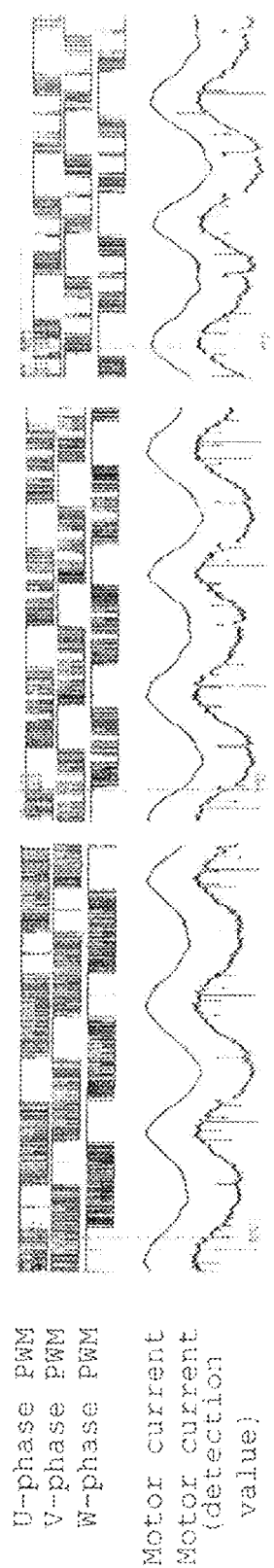

FIGS. 18A and 18B show (A) motor current waveforms detected by the conventional art method (Japanese Patent No. 5178799) and (B) motor current waveforms detected by the method of the embodiment when a modulation factor is substantially 1.0. As understood from the figures, in the conventional art, a current detection rate drops and current waveform distortion becomes larger as an applied voltage rises with the result that the motor speed is increased. On the other hand, the current detection rate is maintained at a high value irrespective of the applied voltage in the embodiment, so that the current waveform has less distortion and is substantially sinusoidal.

According to the foregoing embodiment, the shunt resistance 24 connected to the direct current side of the inverter circuit 23 generates signals according to current values. The current detection section 27 detects the phase currents Iu, Iv and Iw of the motor 4, based on the signals generated by the shunt resistance 24 and the PWM signal pattern. The vector control section 30 determines the rotor position based on the phase currents and generates the three-phase PWM signal pattern in association with the PWM signal generation section 32 so that the pattern follows the rotor position θ. In this case, regarding the U-phase of the three-phase PWM signal pattern, the PWM signal generation section 32 increases/decreases the duty in both directions of phase lag side and phase lead side with reference to the bottom of the carrier period. Regarding the V-phase, the PWM signal generation section 32 increases/decreases the duty in one of both directions of phase lag side and phase lead side with reference to the bottom. Regarding the W-phase, the PWM signal generation section 32 increases/decreases the duty in the other of both directions of phase lag side and phase lead side with reference to the bottom.

The current detection timing point adjusting section 34 detects two-phase currents at the fixed timing points within the carrier period. Further, when detection of two-phase currents at the fixed timing points becomes impossible, the current detection timing point adjusting section 34 adjusts the detection timing points so that regarding at least one phase, the current can be detected at a variable timing point according to the magnitude of output voltage supplied to the inverter circuit 23. Accordingly, the current detection rate can be improved even in a region where the output voltage is high so that overmodulation occurs, with the result that the control accuracy can be improved while the switching loss is suppressed.

The adjusting section 34 further determines whether or not predetermined fixed timing points should be employed or timing points obtained by shifting the fixed timing points should be employed, according to the three-phase PWM signal pattern. More specifically, the minimum width is determined as a minimum duty allowing the current detection section 27 to detect the phase currents and the maximum width is determined based on the minimum width. The two-phase PWM signal output pattern is divided into the patterns (0) to (9) depending upon the combination of three-phase duties corresponding to either the minimum width or the maximum width. Whether or not the current detection is carried out at the fixed timing points or at the shifted timing points, according to the patterns (0) to (9).

As a result, whether or not the other of current detection timing points should be variable can be determined appropriately according to the combination of PWM signals in the three-phase modulation. Further, the current detection can be carried out with reliable determination even when only a single phase current can substantially be detected under an overmodulated state in which the output voltage is extremely high, so that results of current detection can be used for motor control as much as possible.

Further, the air conditioner E includes the heat pump system constituted by the compressor 2, the outdoor side heat exchanger 9, the decompressor 8, the indoor side heat exchanger 7 and the like. The motor control device of the embodiment is provided for controlling the motor 4 constituting the compressor 2. Accordingly, operating efficiencies of the heat pump system 1 and the air conditioner E can be improved.

FIGS. 19A to 33B illustrate a second embodiment. In the second embodiment, identical or similar parts are labeled by the same reference symbols as those in the first embodiment and the description of the identical parts will be eliminated. Only the differences between the first and second embodiments will be described. For example, in pattern (1), a V-phase current is detected at the first detection timing point and a U-phase (negative) current is detected at the second detection timing point. However, as shown in FIG. 19A, when the U-phase pulse approximates to the minimum and the W-phase pulse approximates to the maximum, the U-phase current (negative) is also detected at the first detection timing point. In view of this inadequacy, the U-phase pulse width is subtracted from each one of the V-phase and W-phase pulse widths and the U-phase pulse width is rendered zero in the second embodiment so that a modulation manner is changed to a two-phase modulation. The second detection timing point is shifted to a variable timing point by subtracting the minimum width from W0_bai, so that the V-phase current and the U-phase current (negative) are detected.

Further, in pattern (3), the U-phase current is detected at the first detection timing point and the V-phase current (negative) is detected at the second detection timing point. However, as shown in FIG. 19B, when both U-phase pulse and W-phase pulse approximate to the respective maximums, the V-phase current (negative) is also detected at the first detection timing point. In this case, the V-phase pulse width is subtracted from each one of the U-phase and W-phase pulse widths and the V-phase pulse width is rendered zero so that a modulation manner is changed to a two-phase modulation. The first and second detection timing points are fixed and the U-phase current and the V-phase current (negative) are detected as before.

In pattern (5), the W-phase current (negative) is detected at the first detection timing point and the U-phase current is detected at the second detection timing point. However, as shown in FIG. 19C, when both U-phase pulse and V-phase pulse approximate to the respective maximums, the W-phase current (negative) is also detected at the second detection timing point. In this case, the W-phase pulse width is subtracted from each one of the U-phase and V-phase pulse widths and the W-phase pulse width is rendered zero so that a modulation manner is changed to a two-phase modulation. The first and second detection timing points are fixed and the U-phase current and the V-phase current (negative) are detected as before.

In pattern (7), the W-phase current (negative) can only be detected at the first detection timing point as shown in FIG. 20A. In this case, too, as in pattern (5), the W-phase pulse width is subtracted from each one of the U-phase and V-phase pulse widths and the W-phase pulse width is rendered zero so that a modulation manner is changed to a two-phase modulation. As a result, the U-phase current is detectable at the second detection timing point (fixed). In pattern (9), too, as shown in FIGS. 20B and 20C, the U-phase pulse width is subtracted from each one of the V-phase and W-phase pulse widths and the U-phase pulse width is rendered zero so that a modulation manner is changed to a two-phase modulation. As a result, the V-phase current is detectable at the first detection timing point (fixed) when the V-phase current is larger than (>) the W-phase current. The W-phase current is detectable at the second detection timing point (variable) when the V-phase current is smaller than (<) the W-phase current.

Figure 21:
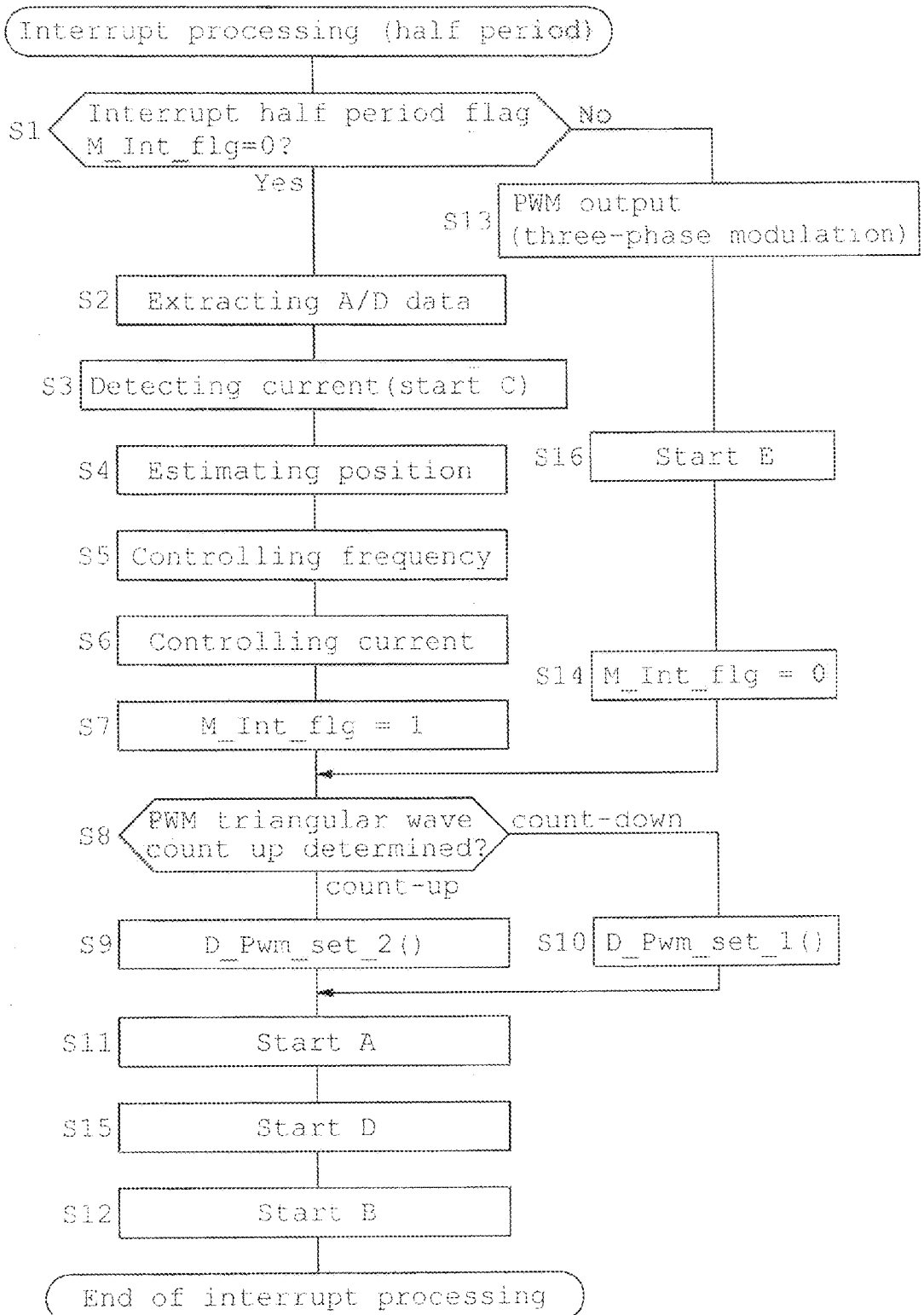
FIG. 21 is a flowchart showing interrupt processing carried out every half period of the carrier.
Figure 22:
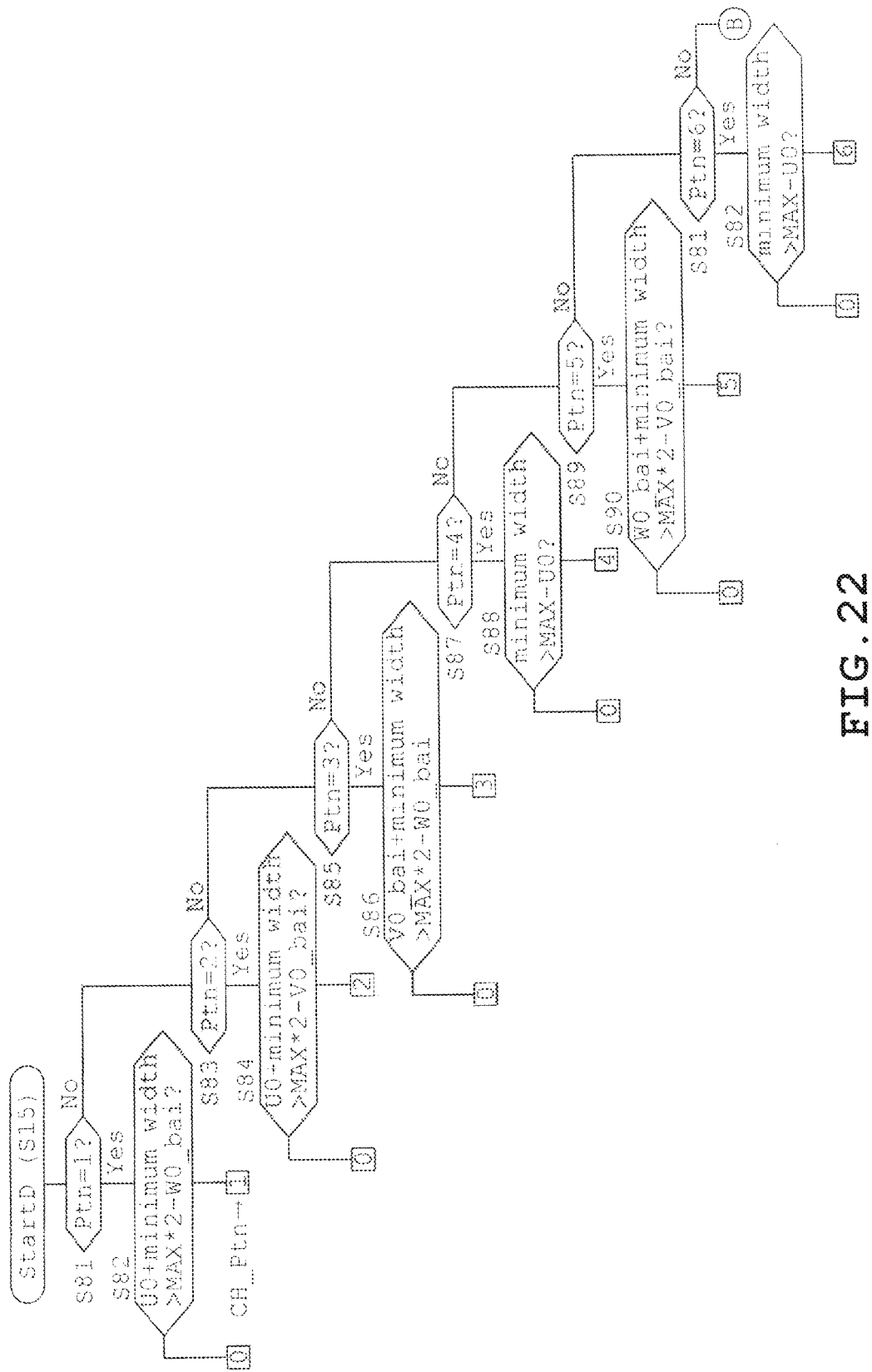
FIG. 22 is a flowchart (No. 1) showing processing contents of step S15.
Figure 23:
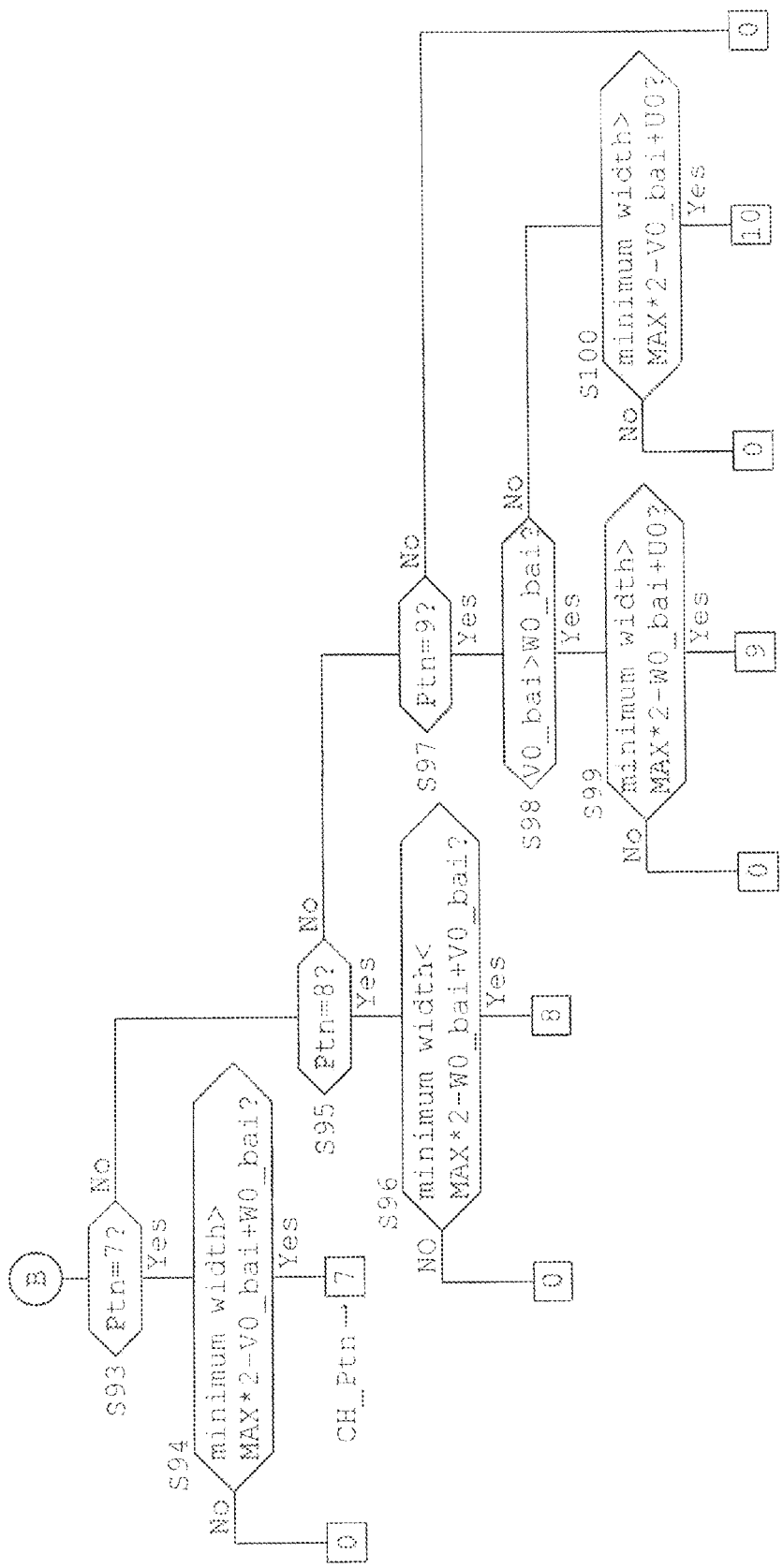
FIG. 23 is a flowchart (No. 2) showing processing contents of step S15.

The following will describe processing procedures for realizing the foregoing current detecting manners. Referring to FIG. 21 corresponding to FIG. 3, start D is executed between steps S11 and S12 (step S15) and start E is executed between steps S13 and S14 (step S16). Processing steps are thus added. At start D, the patterns (0) to (9) are divided into channel patterns (0) to (10) (subpatterns: CH_Ptn). The term, "MAX" stands for 50% duty in the following description. The channel pattern (0) is inclusive of all patterns that do not fall into the channel patterns (1) to (10).

<Pattern (1)>→Steps S81 and S82
U0+minimum width>MAX×2−W0_bai→channel pattern (1)

<Pattern (2)>→Steps S83 and S84
U0+minimum width>MAX×2−V0_bai→channel pattern (2)

<Pattern (3)>→Steps S85 and S86
V0_bai+minimum width>MAX×2−W0_bai→channel pattern (3)

<Pattern (4)>→Steps S87 and S88
Minimum width>MAX−U0→channel pattern (4)

<Pattern (5)>→Steps S89 and S90
W0_bai+minimum width>MAX×2−V0_bai→channel pattern (5)

<Pattern (6)>→Steps S91 and S92
Minimum width>MAX−U0→channel pattern (6)

<Pattern (7)>→Steps S93 and S94
Minimum width<MAX×2−V0_bai+W0_bai→channel pattern (7)

<Pattern (8)>→Steps S95 and S96
Minimum width<MAX×2−W0_bai+V0_bai→channel pattern (8)

<Pattern (9)>→Steps S97 to S100
V0_bai>W0_bai and minimum width>MAX×2−W0_bai+U0→channel pattern (9)
V0_bai≤W0_bai and minimum width>MAX×2−V0_bai+U0→channel pattern (10)

Figure 24:
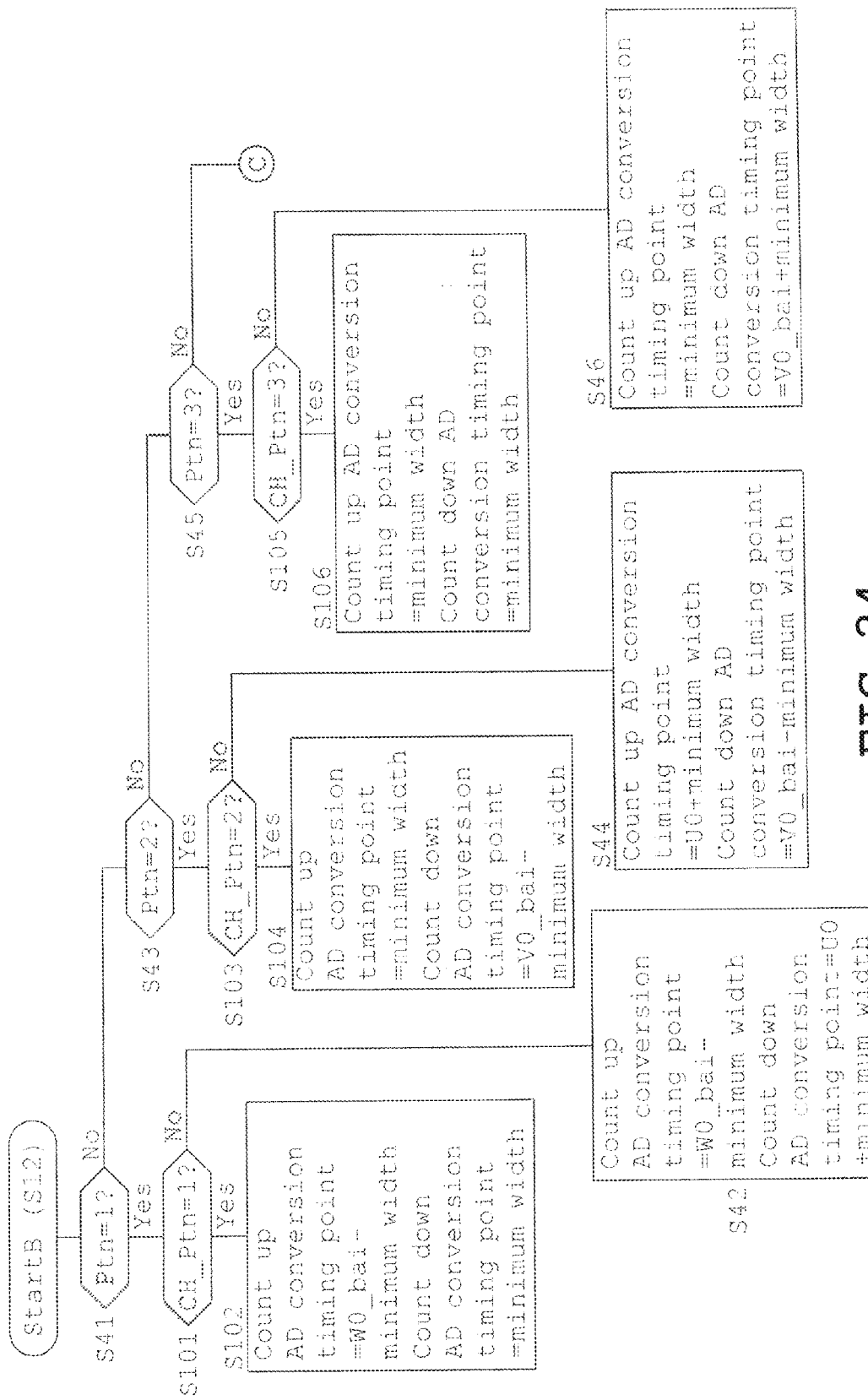
FIG. 24 is a flowchart (No. 1) showing processing contents of step S12.
Figure 25:
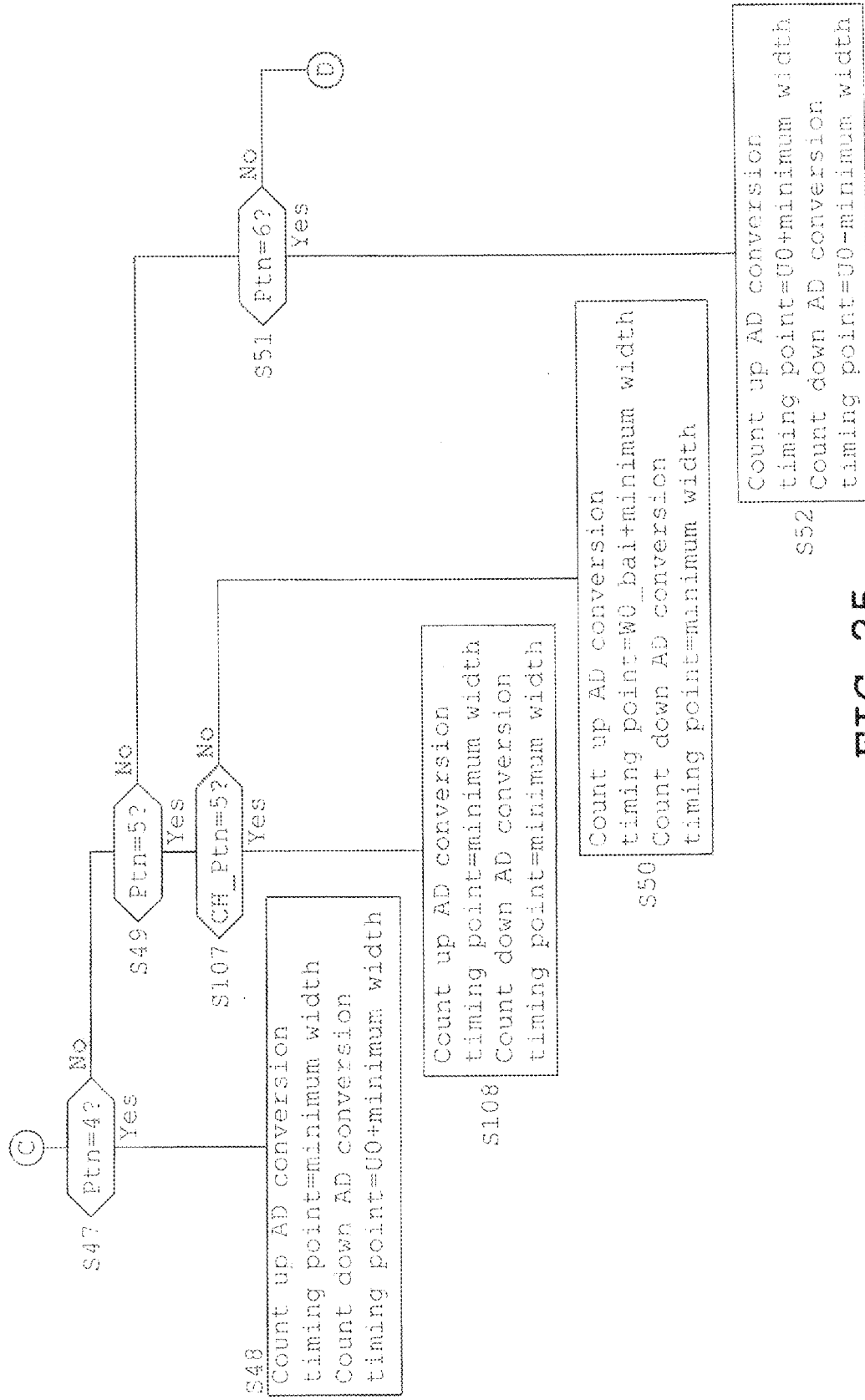
FIG. 25 is a flowchart (No. 2) showing processing contents of step S12.
Figure 26:
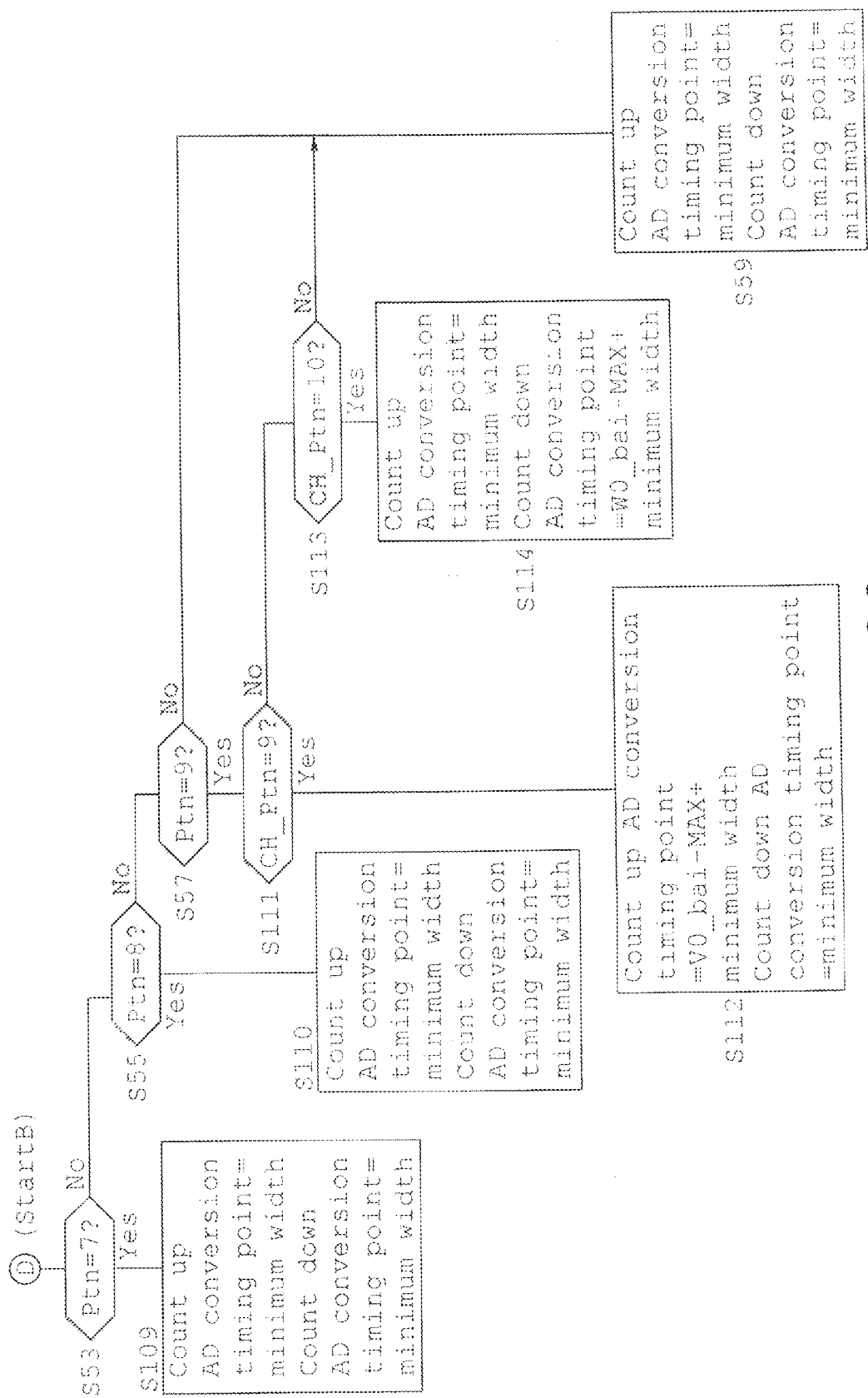
FIG. 26 is a flowchart (No. 3) showing processing contents of step S12.

FIGS. 24 to 26 show processing of start B and correspond to FIGS. 11 and 12. In FIG. 24, it is determined whether or not each one of the patterns (1) to (3) is a channel pattern (1), (2) or (3) (steps S101, S103 and S105). When each pattern is channel pattern (1) (YES at step S101), the first detection timing point is set to the minimum value (fixed) (step S102). When each pattern is channel pattern (2) (YES at step S103), the second detection timing point is set to the minimum value (fixed) (S104). When each pattern is channel pattern (3) (YES at step S105), the first and second detection timing points are set to the minimum value (fixed) (step S106).

In FIG. 25, it is determined whether or not pattern (5) is channel pattern (5) (step S107). When pattern (5) is channel pattern (5) (YES), the first and second detection timing points are set to the minimum value (fixed) (step S108). Since each one of patterns (4) and (6) have the same detection timing points as channel patterns (4) and (6) respectively, each one of patterns (4) and (6) is processed in the same manner as in the first embodiment.

In FIG. 26, since patterns (7) and (8) become channel patterns (7) and (8) without any change respectively, the first and second detection timing points are set to the minimum value (fixed) (steps S109 and S110). Pattern (9) is either channel pattern 9 or 10. When pattern (9) is channel pattern (9), the first detection timing point is set to the minimum width (fixed) and the second detection timing point is set to a value obtained by subtracting the maximum value of three-phase duty from V0_bai and adding minimum width (variable) (step S112).

Further, when pattern (9) is channel pattern (10), the first detection timing point is set to a value obtained by subtracting the maximum value of three-phase duty from W0_bai and adding minimum width (variable), and the second detection timing point is set to the minimum width (fixed) (step S114).

Figure 27:
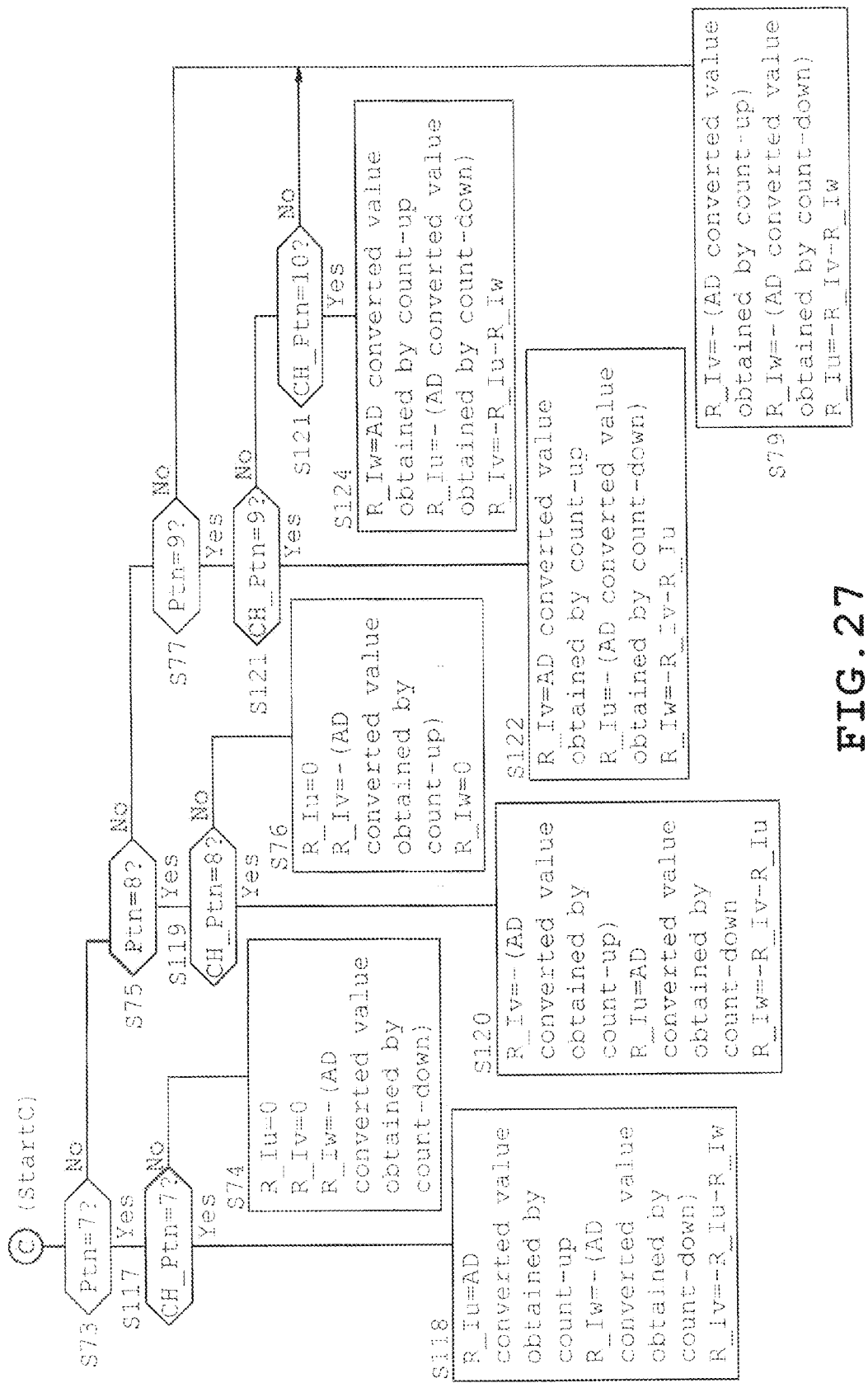
FIG. 27 is a flowchart showing processing contents of step S3.

FIG. 27 shows processing of start C and partially corresponds to FIG. 15. In FIG. 27, it is determined whether or not each one of patterns (7) to (9) is channel pattern (7), (8), (9) or (10) (steps S117, S119, S121 and S123). When each one of patterns (7) to (9) is channel pattern (7), the U-phase A/D converted value obtained at the second detection timing is substituted for the variable R_Iu at step S118. Further, the W-phase A/D converted value obtained at the first detection timing point and negativized is substituted for the variable R_Iw. A V-phase current R_Iv is obtained by R_Iv=−R_Iu−R_Iw.

When each one of patterns (7) to (9) is channel pattern (8), a V-phase A/D converted value obtained at the second detection timing point and negativized is substituted for the variable R_Iv and a U-phase A/D converted value obtained at the first detection timing point is substituted for a variable R_Iu, at step S120. A W-phase current R_Iw is obtained by R_Iw=−R_Iu−R_Iv.

When each one of patterns (7) to (9) is channel pattern (9), a U-phase A/D converted value obtained at the second detection timing point and negativized is substituted for the variable R_Iu, at step S122. Further, a V-phase A/D converted value obtained at the first detection timing point is substituted for the variable R_Iv. A W-phase current R_Iw is obtained by R_Iw=−R_Iu−R_Iv.

When each one of patterns (7) to (9) is channel pattern (10), a W-phase A/D converted value obtained at the second detection timing point is substituted for the variable R_Iw. Further, a U-phase A/D converted value obtained at the first detection timing point and negativized is substituted for the variable R_Iu. A U-phase current R_Iv is obtained by R_Iv=−R_Iu−R_Iw.

When exceeding (MAX−minimum value), the second detection timing point during count-up is replaced by the value of (MAX−minimum value) although this is not shown in the flowchart of start C. Further, when being less than 0, the second detection timing point is replaced by 0, so that malfunction is avoided. The same manner is applied to the (first) detection timing point during count-down.

Figure 28:
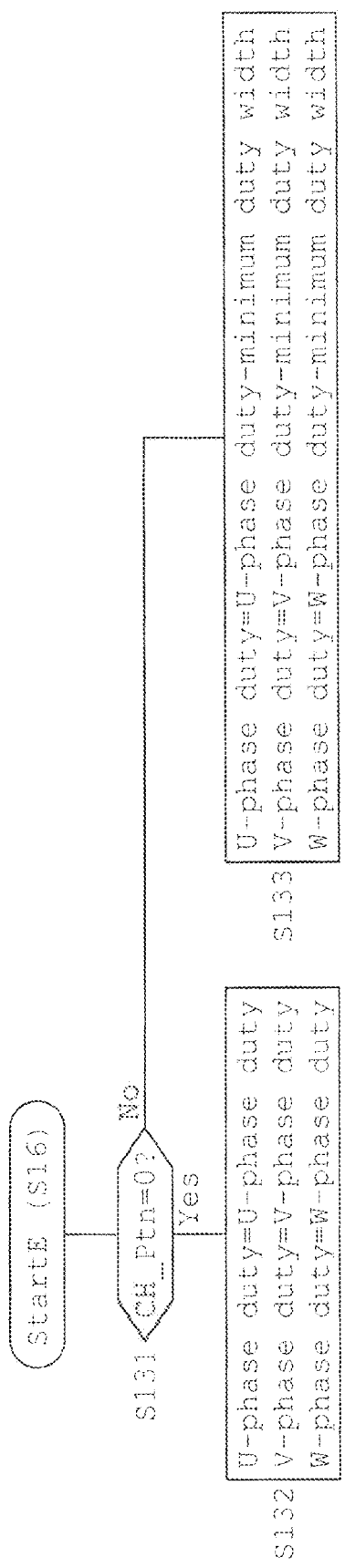
FIG. 28 is a flowchart showing processing contents of step S16.

FIG. 28 sows processing of start E. It is determined whether or not each pattern is channel pattern (0) (step S131). When each pattern is channel pattern (0) (YES), the three-phase modulation is executed as in the first embodiment, so that U-, V- and W-phase duties are maintained. On the other hand, when each pattern is not channel pattern (0) (NO), the two-phase modulation is executed, so that a minimum of the U-, V- and W-phase duties is subtracted from each one of the duties (step S133).

Figure 29:
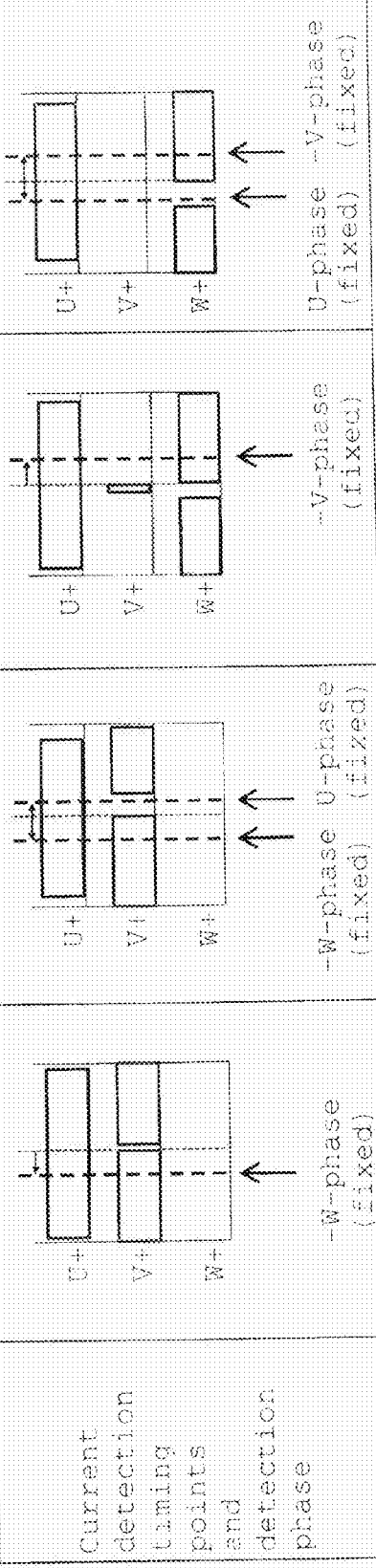
FIG. 29 shows examples of PWM pulse waveforms and current detection timing in the case where patterns 7 to 9 to be divided by the processing of FIGS. 22 and 23 are divided into channel patterns 7 to 9 and 0 (No. 1)
Figure 31:
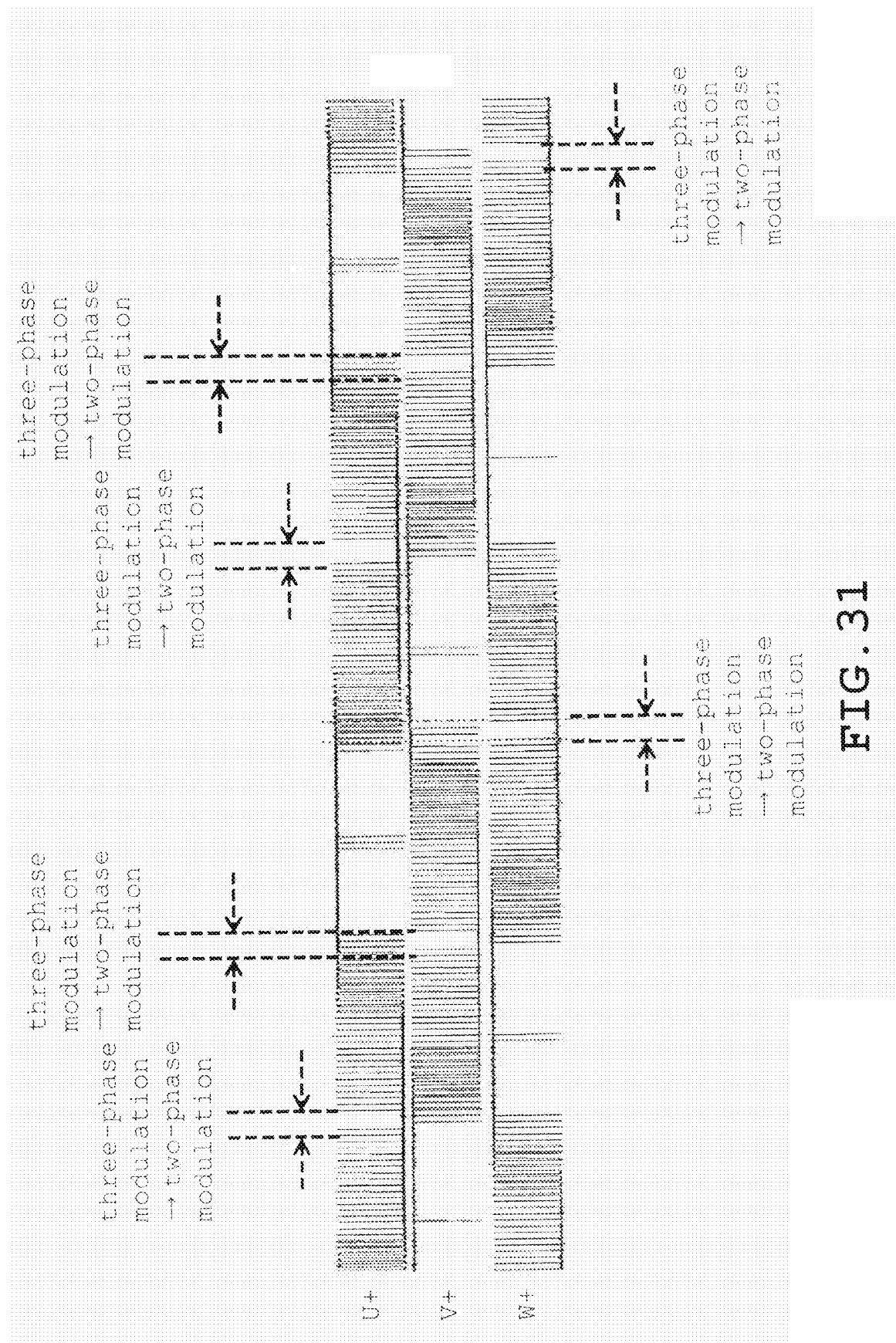
FIG. 31 show phase PWM signal waveforms in the case where three-phase modulation and two-phase modulation are carried out by mixture.

FIGS. 29 and 30 show conditions on which the patterns (7) to (9) are divided into channel patterns (7) to (10) and changes in the current detection timing points. Further, FIG. 31 shows PWM signal waveforms in the case where three-phase modulation and two-phase modulation are executed by mixture, and FIGS. 32A and 32B are views similar to FIGS. 18A and 18B, showing that the second embodiment can improve the current detection rate with the result of reduction in the waveform distortion.

According to the second embodiment, the PWM signal generation section 32 subtracts the minimum duty of one of the three-phase PWM signals from each one of the remaining two phase duties, thereby generating two-phase PWM signals. The current detection timing point adjusting section 34 detects current at the fixed detection timing point with respect to at least one of the patterns of two-phase PWM signals. More specifically, the patterns (1) to (9) are divided into the channel patterns (0) to (10) and two-phase modulation is carried out depending upon the results of division, so that the current detection timing points and the current phases to be detected are shifted. Accordingly, the current detection efficiency can be improved in the embodiment as compared with the conventional art with the result that waveform distortion of the current supplied to the motor can be reduced.

Figure 33A:
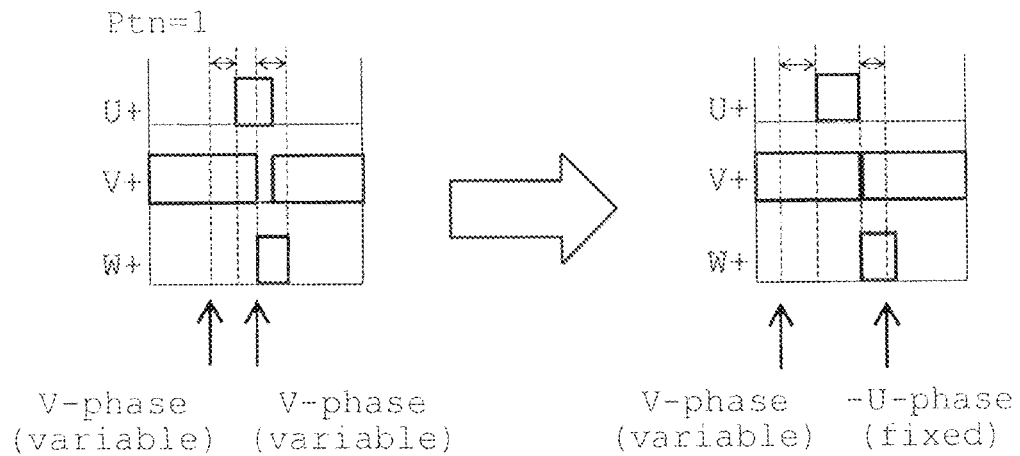
FIGS. 33A and 33B explain the operation of a third embodiment (No. 1)

FIGS. 33A to 43 show a third embodiment. In the third embodiment, the duty of one of three phases represents a value approximate to the maximum (a maximal phase), whereas duties of the other two phases represent respective values approximate to the minimum (minimum phases). The third embodiment copes with a case where the duty difference is excessively large. For example, in the case of pattern (1) as shown in FIG. 33A, the V-phase duty is larger and the U-phase and W-phase duties are smaller, and the V-phase current is disadvantageously detected at first and second detection timing points.

In view of the foregoing case, the V-phase duty is subtracted from 100%, and the resultant value is added to each phase duty. The V-phase duty becomes 100%. Further, the increasing/decreasing direction of the U-phase duty is shifted to be opposed to that of the W-phase duty from the bottom of the triangular wave. Still further, the variable second detection timing point is shifted to be fixed, so that the U-phase current (negative) is detected at the second detection timing point as before.

Figure 33B:
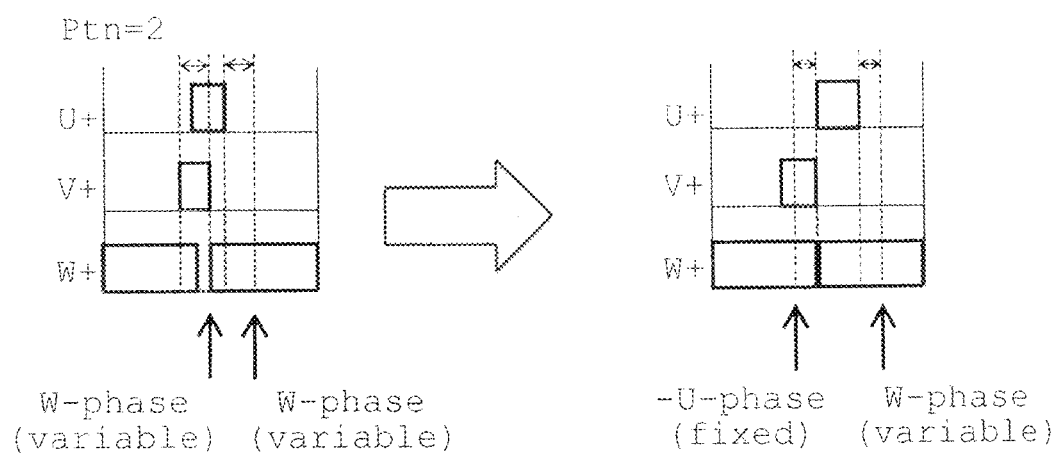

In the pattern (2) as shown in FIG. 33B, the W-phase duty is larger and the U-phase and V-phase duties are smaller. In this case, the W-phase current is disadvantageously detected at the first and second detection timing points. In view of this, the W-phase duty is subtracted from 100%, and the resultant value is added to each phase duty in the same manner as described above. The increasing/decreasing direction of the U-phase duty is shifted to be opposed to that of the V-phase duty from the bottom of the triangular wave. Still further, the variable first detection timing point is shifted to be fixed, so that the U-phase current (negative) is detected at the second detection timing point as before.

Figure 34A:
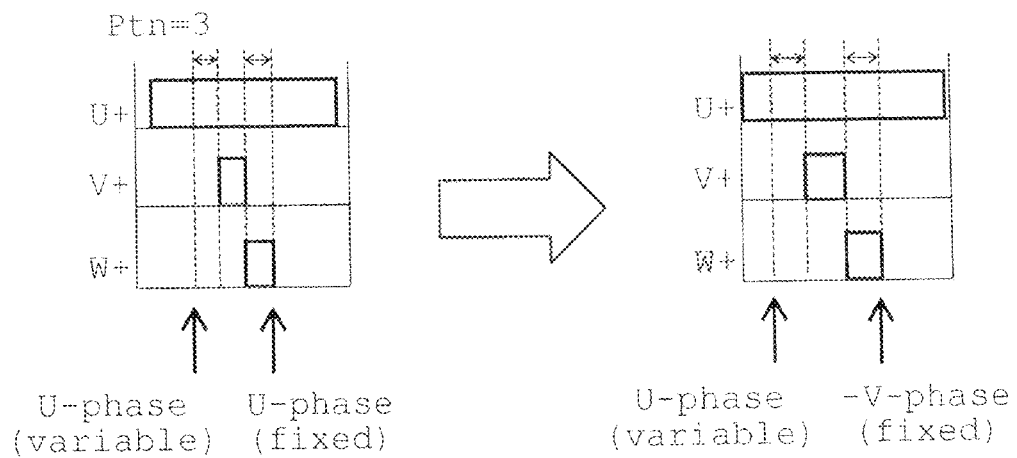
FIGS. 34A and 34B explain the operation of the third embodiment (No. 2)

In the pattern (3) as shown in FIG. 34A, the U-phase duty is larger and the V-phase and W-phase duties are smaller. In this case, the U-phase current is disadvantageously detected at the first and second detection timing points. In view of this, the W-phase duty is subtracted from 100%, and the resultant value is added to each phase duty. The V-phase current (negative) is detected at the second detection timing point. In this case, the U-phase duty is not shifted.

Figure 34B:
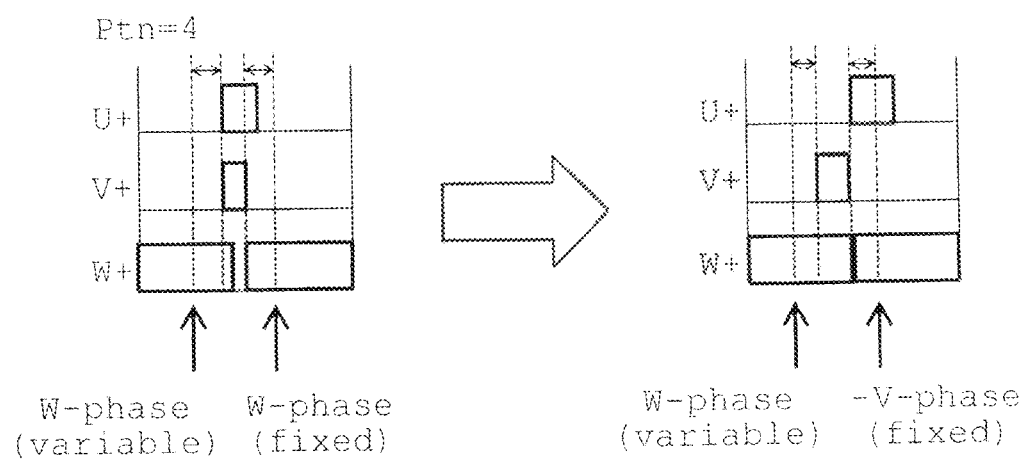

In the pattern (4) as shown in FIG. 34B, the W-phase duty is larger and the U-phase and V-phase duties are smaller. In this case, the W-phase current is disadvantageously detected at the first and second detection timing points. In view of this, the W-phase duty is subtracted from 100%, and the resultant value is added to each phase duty. The increasing/decreasing direction of the U-phase duty is shifted to be opposed to that of the V-phase duty from the bottom of the triangular wave. The V-phase current (negative) is detected at the second detection timing point.

Figure 35A:
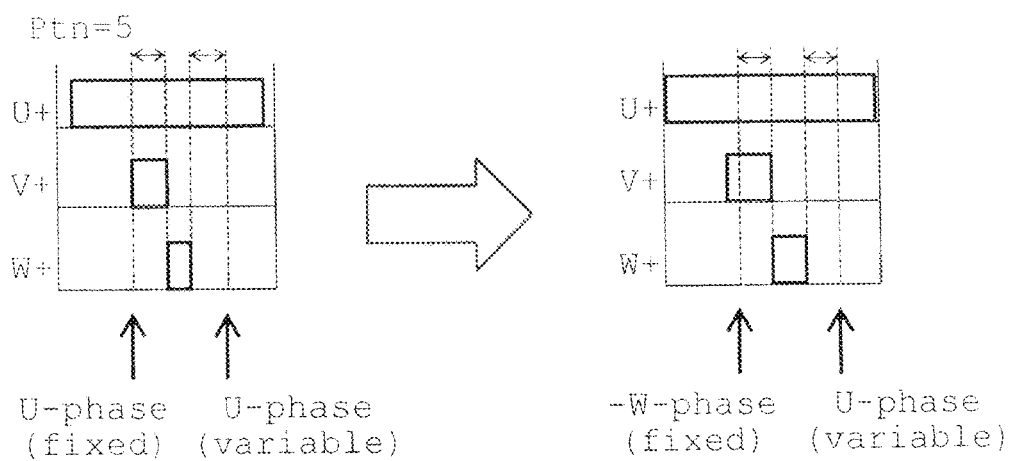
FIGS. 35A and 35B explain the operation of the third embodiment (No. 3)

In the pattern (5) as shown in FIG. 35A, the U-phase duty is larger and the V-phase and W-phase duties are smaller. In this case, the U-phase current is disadvantageously detected at the first and second detection timing points. In view of this, the U-phase duty is subtracted from 100%, and the resultant value is added to each phase duty. The W-phase current (negative) is detected at the first detection timing point. In this case, the U-phase duty is not shifted.

Figure 35B:
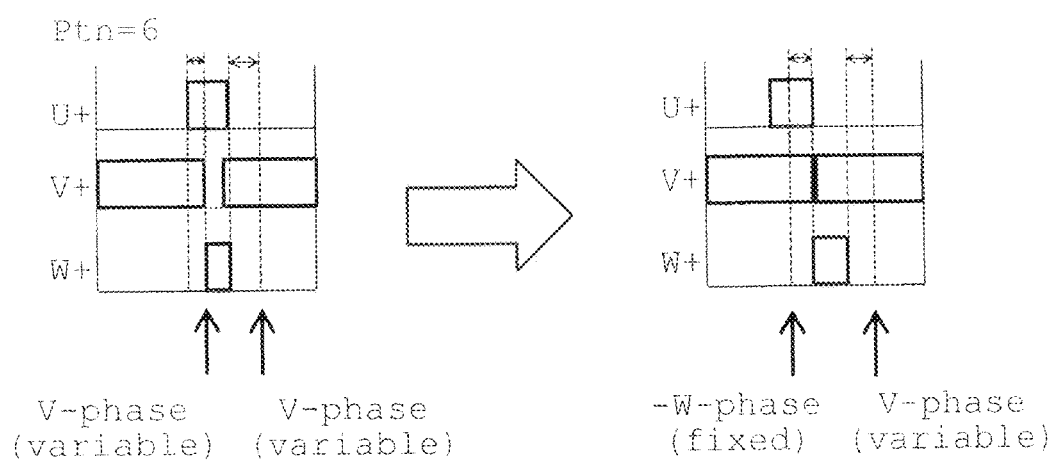

In the pattern (6) as shown in FIG. 35B, the V-phase duty is larger and the U-phase and W-phase duties are smaller. In this case, the V-phase current is disadvantageously detected at the first and second detection timing points. In view of this, the V-phase duty is subtracted from 100%, and the resultant value is added to each phase duty. The increasing/decreasing direction of the U-phase duty is shifted to be opposed to that of the W-phase duty from the bottom of the triangular wave. The W-phase current (negative) is detected at the first detection timing point. The above-described processing need not be carried out regarding the patterns (7) to (9).

Figure 36:
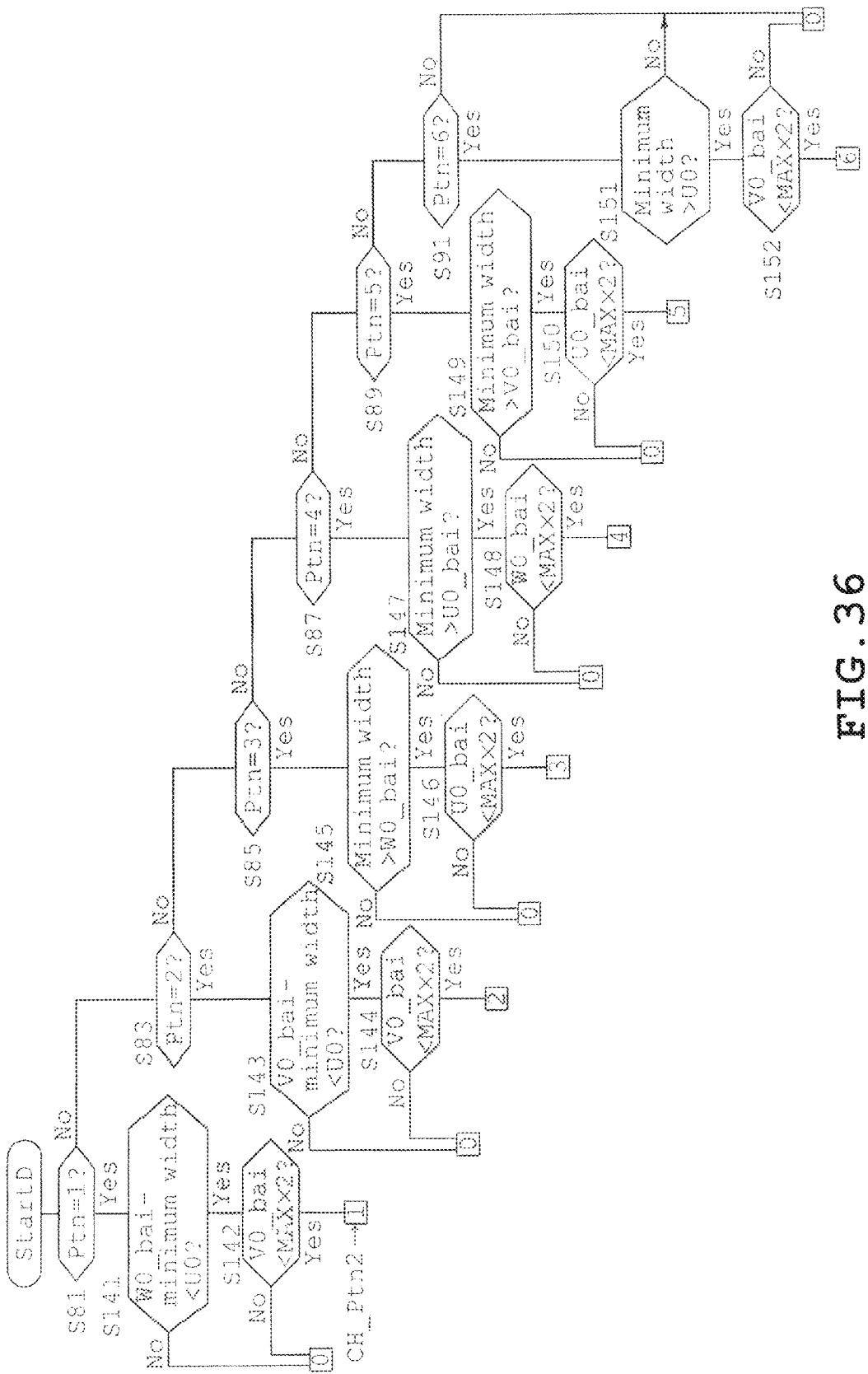
FIG. 36 is a flowchart similar to FIG. 22.

The processing to achieve the foregoing operation will now be described with reference to FIGS. 36 to 42. In start D, as shown in FIG. 36, patterns (0) to (6) are divided into channel patterns (subpatterns: CH_Ptn2) (0) to (6) differing from those in the second embodiment. The channel pattern (0) is inclusive of all patterns that do not fall into the channel patterns (1) to (6).

<Pattern (1)>→Steps S81, S141 and S142
W0_bai−minimum width<U0 and V0_bai<MAX×2 (100%)→channel pattern (1)

<Pattern (2)>→Steps S83, S143 and S144
V0_bai−minimum width<U0 and V0_bai<MAX×2→channel pattern (2)

<Pattern (3)>→Steps S85, S145 and S146
Minimum width>W0_bai and U0_bai<MAX×2→channel pattern (3)

<Pattern (4)>→Steps S87, S147 and S148
Minimum width>U0_bai and W0_bai<MAX×2→channel pattern (4)

<Pattern (5)>→Steps S89, S149 and S150
Minimum width>V0_bai and U0_bai<MAX×2→channel pattern (5)

<Pattern (6)>→Steps S89, S149 and S150
Minimum width>U0 and V0_bai<MAX×2→channel pattern (6)

Figure 37:
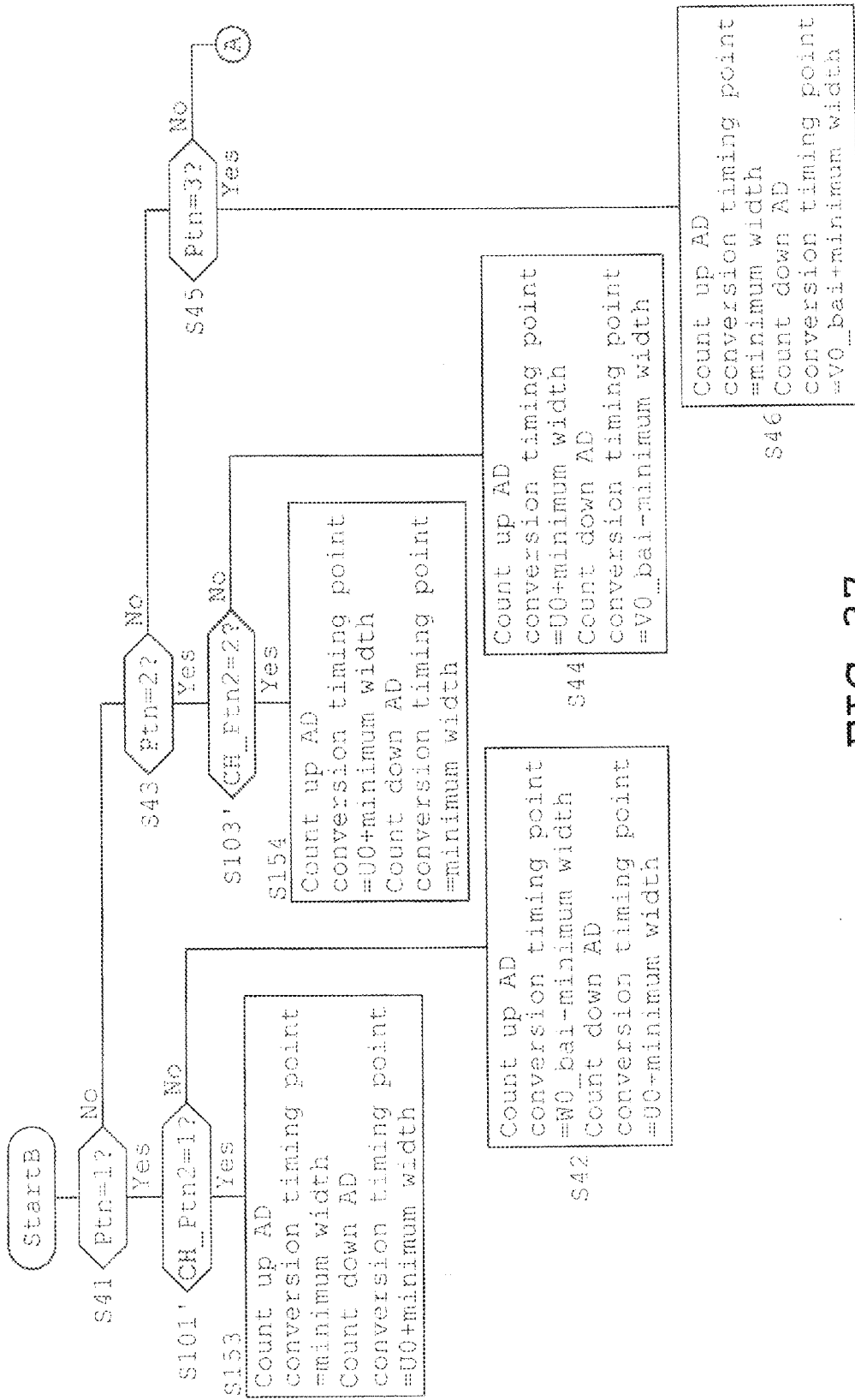
FIG. 37 is a flowchart similar to FIG. 24.
Figure 38:
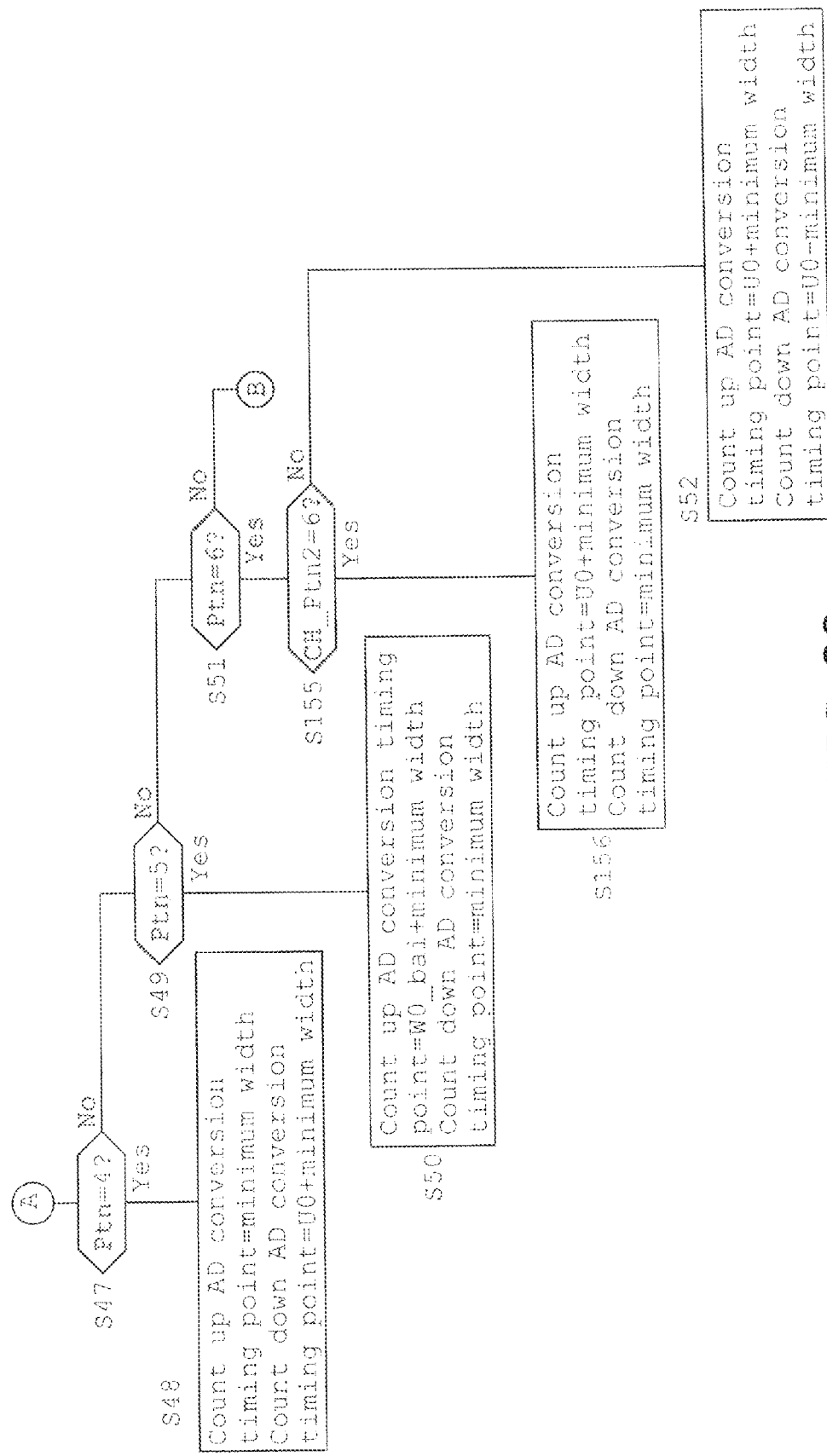
FIG. 38 is a flowchart similar to FIG. 25.

FIGS. 37 and 38 show processing of start B and correspond to FIGS. 24 and 25. It is determined whether or not patterns (1), (2) and (6) are channel patterns (1), (2) and (6) respectively (steps S101', S103' and S155). When the pattern (1) is the channel pattern (1) (YES at step S101'), the first detection timing point is set to (U0+minimum value) and the second detection timing point is set to the minimum value (step S153). Further, when the pattern (2) is the channel pattern (2) (YES at step S103'), the first detection timing point is set to the minimum value and the second detection timing point is set to (U0+minimum value) (step S154). When the pattern (6) is the channel pattern (6) (YES at step S155), the first detection timing point is set to the minimum value and the second detection timing point is set to (U0+minimum value) (step S156). The remainder is processed in the same manner as in the second embodiment.

Figure 39:
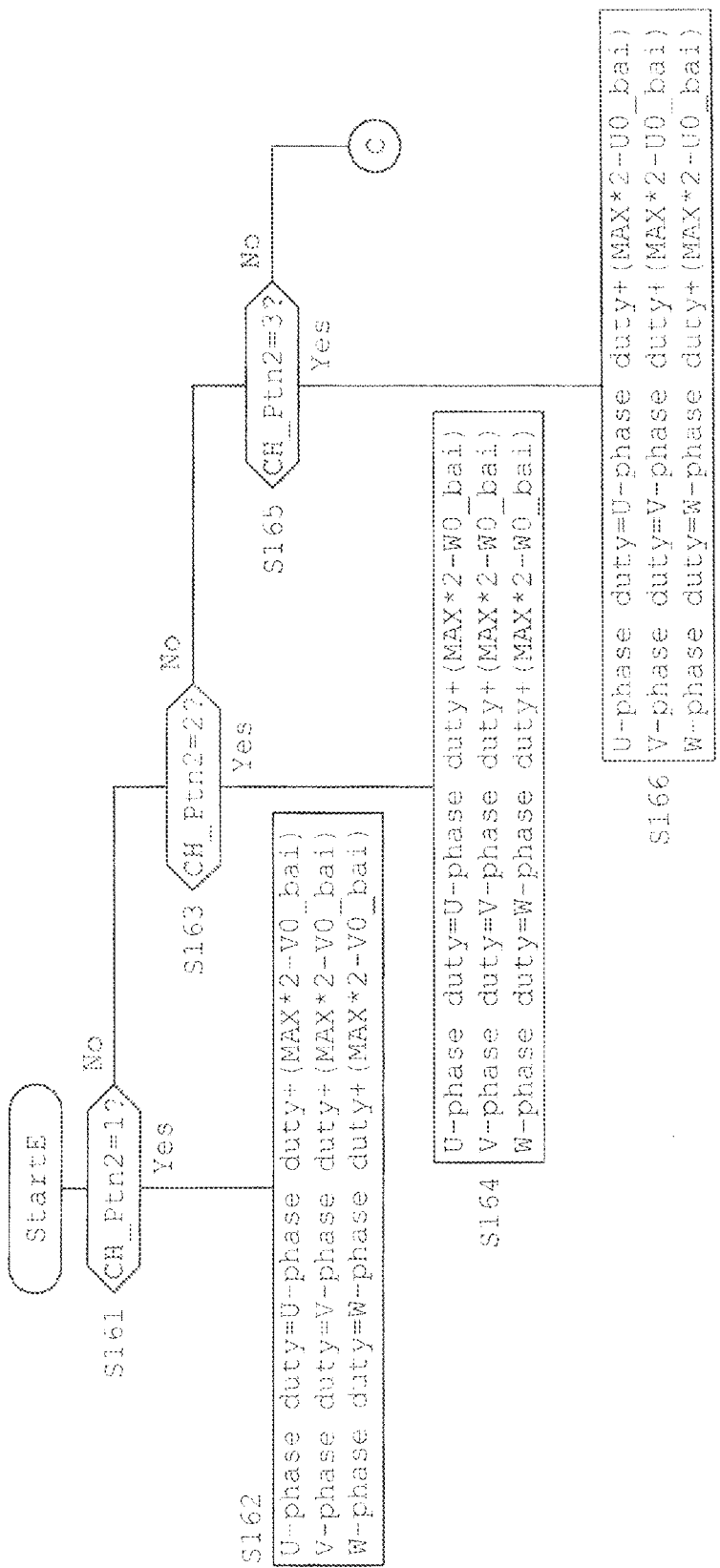
FIG. 39 is a flowchart (No. 1) similar to FIG. 28.
Figure 40:
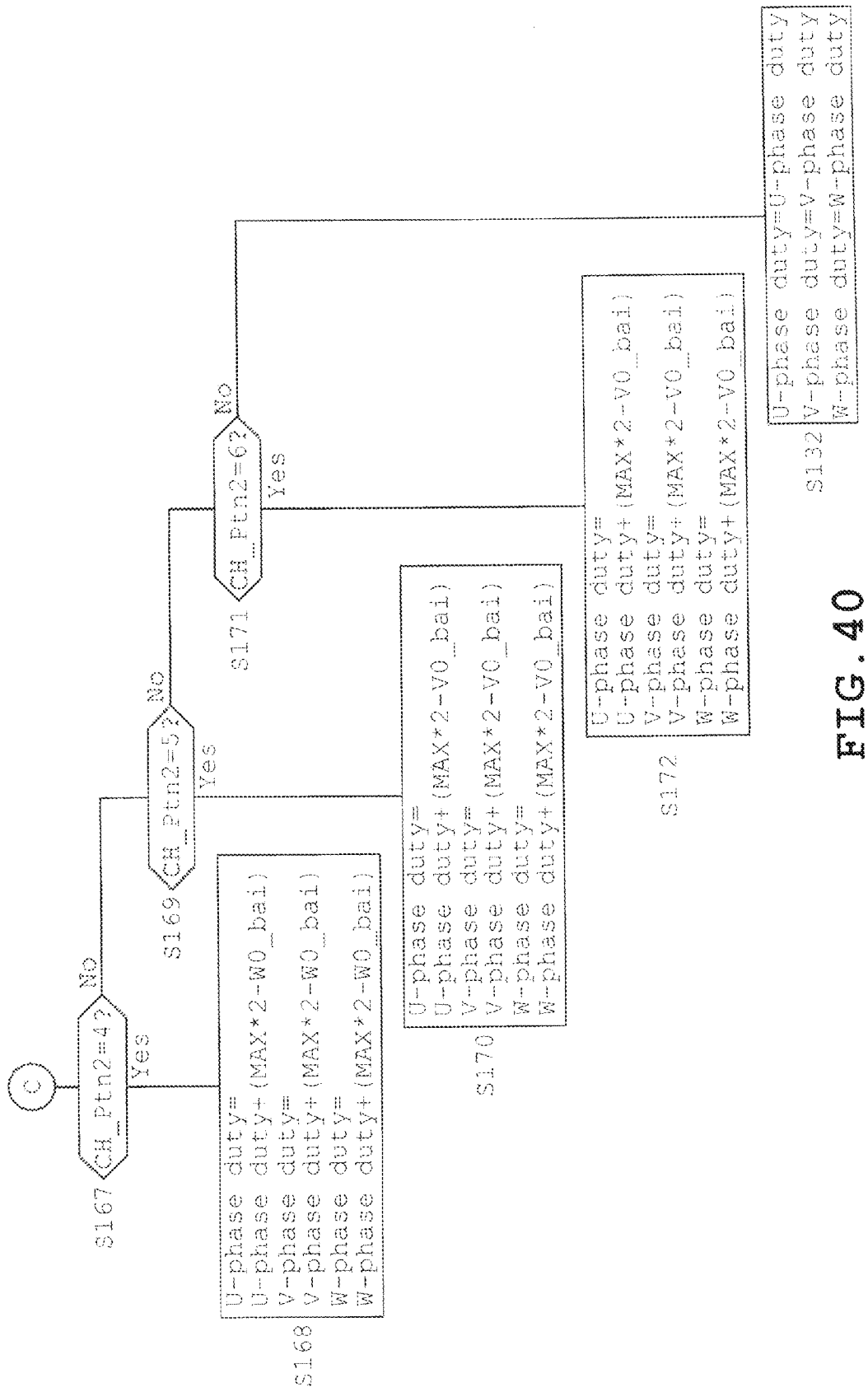
FIG. 40 is a flowchart (No. 2) similar to FIG. 28.

Start E as shown in FIGS. 39 and 40 is the processing of addition to the duties according to channel patterns (1) to (6).

<Channel Pattern (1)>→Steps S161 and S162
V0_bai is subtracted from 100% and the result of subtraction is added to each one of the U-phase, V-phase and W-phase duties.

<Channel Pattern (2)>→Steps S163 and S164
W0_bai is subtracted from 100% and the result of subtraction is added to each one of the U-phase, V-phase and W-phase duties.

<Channel Pattern (3)>→Steps S165 and S166
U0_bai is subtracted from 100% and the result of subtraction is added to each one of the U-phase, V-phase and W-phase duties.

<Channel Pattern (4)>→Steps S167 and S168
W0_bai is subtracted from 100% and the result of subtraction is added to each one of the U-phase, V-phase and W-phase duties.

<Channel Pattern (5)>→Steps S169 and S170
V0_bai is subtracted from 100% and the result of subtraction is added to each one of the U-phase, V-phase and W-phase duties.

<Channel Pattern (6)>→Steps S171 and S172
V0_bai is subtracted from 100% and the result of subtraction is added to each one of the U-phase, V-phase and W-phase duties.

Figure 41:
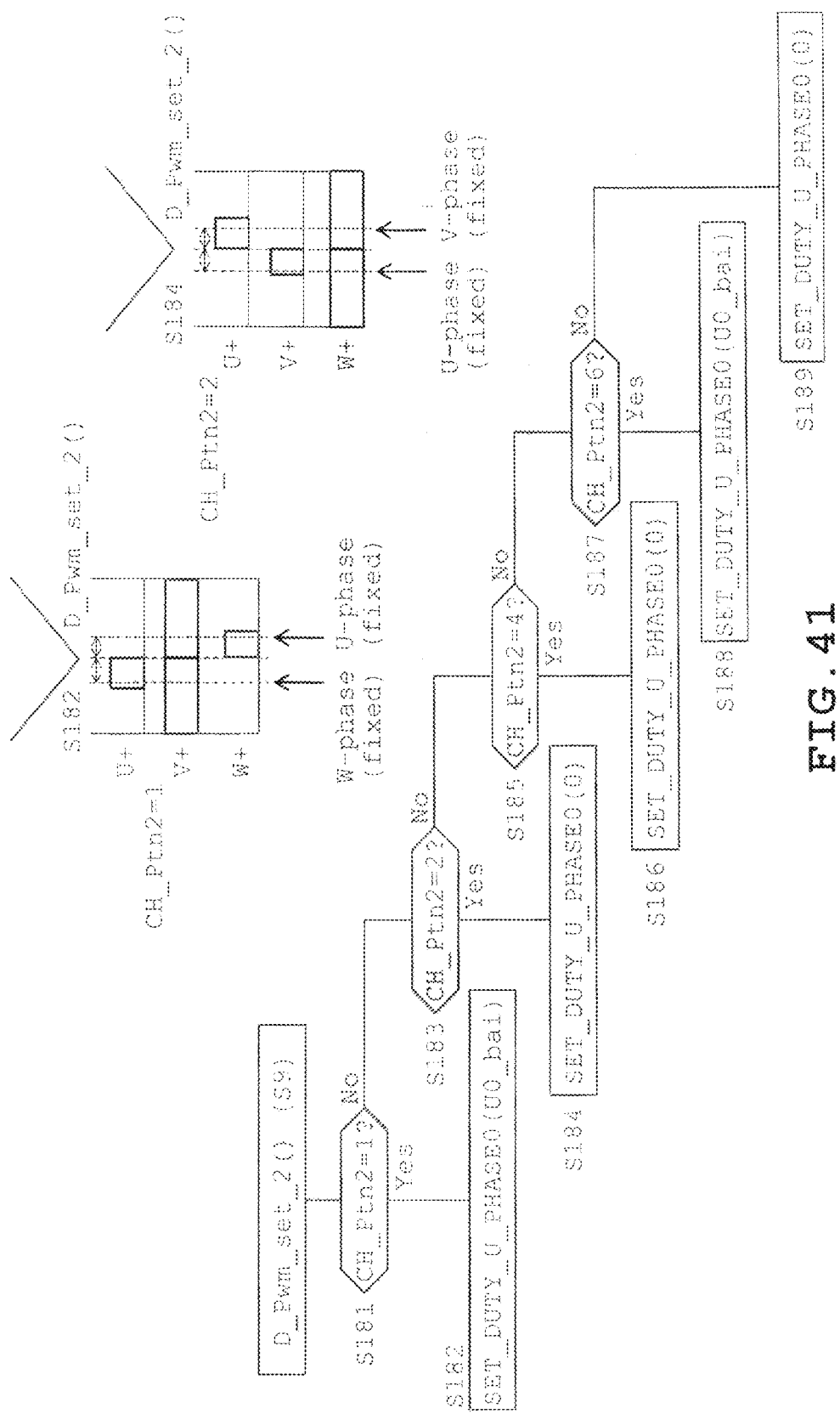
FIG. 41 is a flowchart showing the processing at step S9 in more detail.

FIG. 41 show the process of shifting the increasing/decreasing direction of U-phase duty within step S9 (first half of carrier period).

<Channel Pattern (1)>→Steps S181 and S182
(U0×2) corresponds to the U-phase duty. "Set_duty_U_phase 0 (U0_bai)" at step S192 indicates that U0_bai is output in the first half of carrier period so that the U-phase duty is output in the direction opposed to that of the W-phase duty on the basis of the bottom of the triangular wave.

<Channel Pattern (2)>→Steps S183 and S184
"Set_duty_U_phase 0 (0)" at step S194 indicates that the U-phase duty is not output in the first half of carrier period. U0_bai is to be output in the last half of carrier period.

<Channel Pattern (4)>→Steps S195 and S196
The same processing is carried out at step S196 as at step S194.

<Channel Pattern (6)>→Steps S187 and S188
The same processing is carried out at step S198 as at step S192.

Regarding the channel patterns other than (1), (2), (4) and (6), step S189 is determined as SET_DUTY_U_PHASE0 (U0), which indicates that the U-phase duty is normally increased/decreased in both directions from the bottom of the amplitude of triangular waves.

Figure 42:
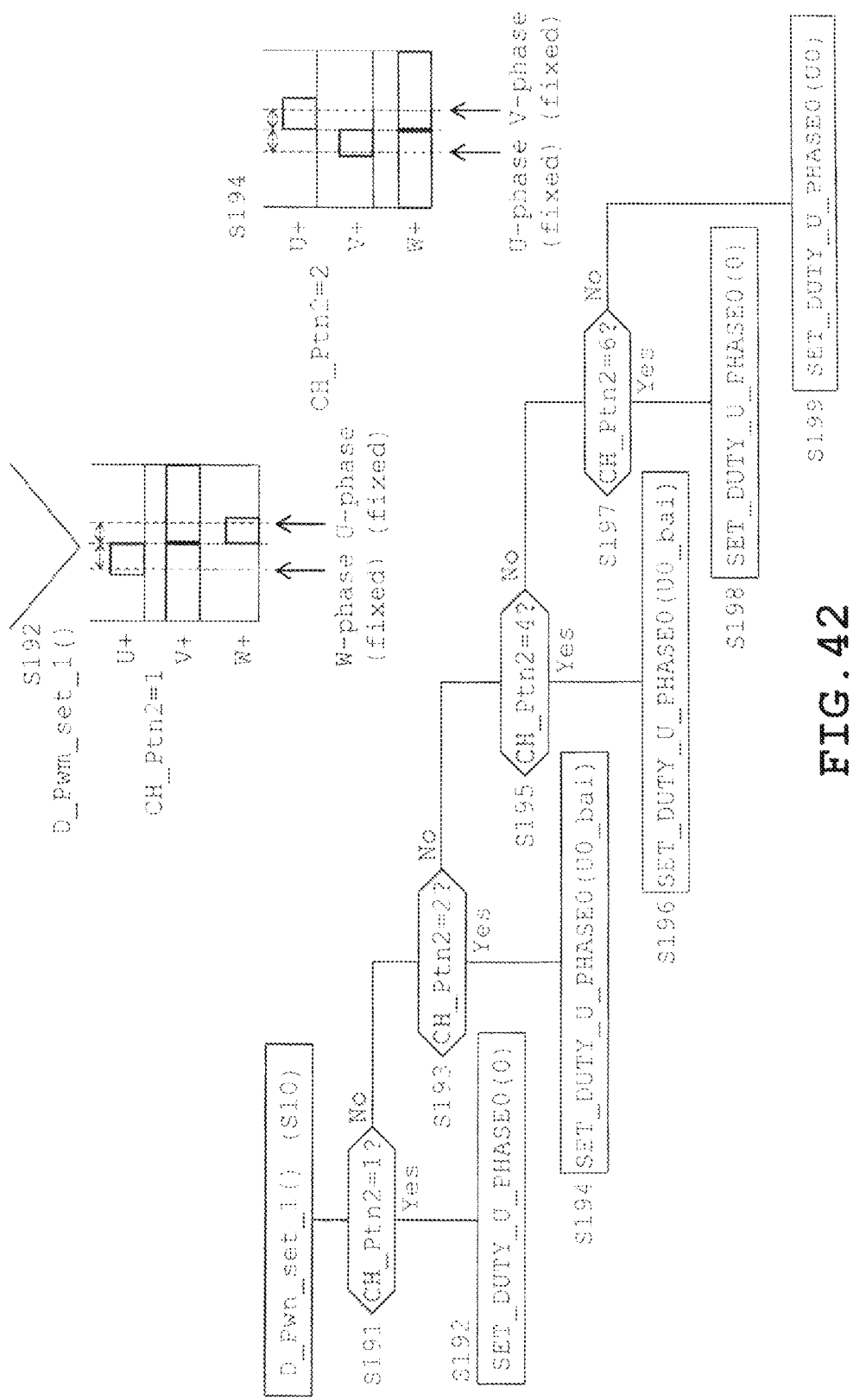
FIG. 42 is a flowchart showing the processing at step S10 in more detail.

FIG. 42 shows a process of shifting the increasing/decreasing direction of the U-phase duty pulses at step S10 (in the last half of the carrier period).

<Channel Pattern (1)>→Steps S191 and D192
No U-phase duty is output in the last half of the carrier period. U0_bai is output in the first half of the carrier period.

<Channel Pattern (2)>→Steps S193 and D194
U0_bai is output in the last half of the carrier period. No U-phase duty is output in the first half of the carrier period.

<Channel Pattern (4)>→Steps S195 and D196

The same processing is carried out at step S196 as at step S194.

<Channel Pattern (6)>→Steps S197 and D198

The same processing is carried out at step S198 as at step S192.

Regarding the channel patterns other than (1), (2), (4) and (6), the same processing is carried out at step S199 as at step S189.

Figure 43A:
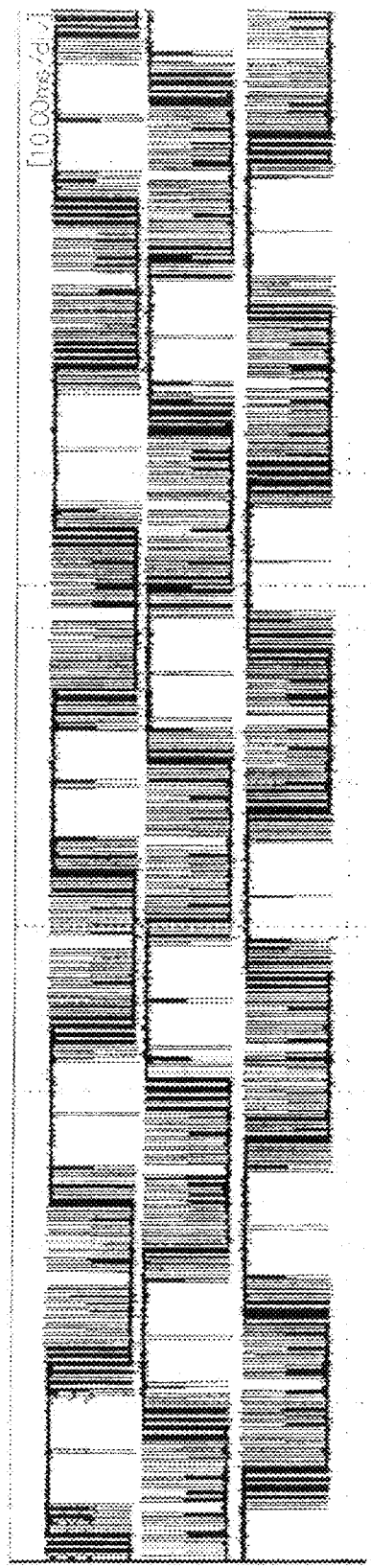
FIGS. 43A and 43B show three-phase PWM pattern in the case where the processing in the third embodiment is applied to a practical case.
Figure 43B:
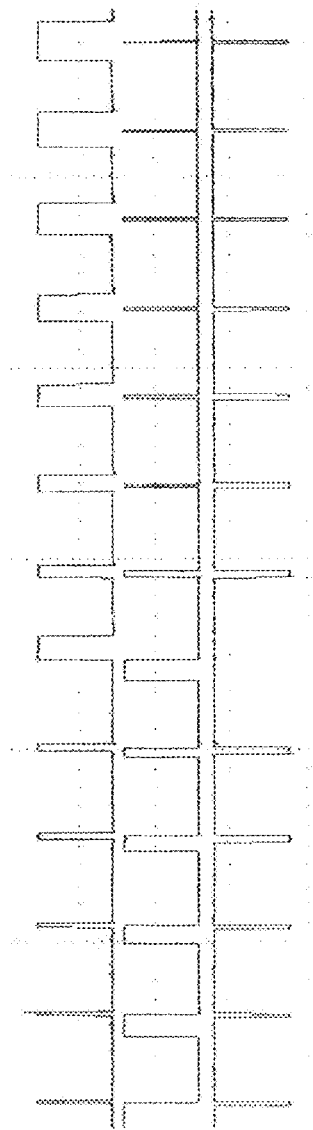

FIGS. 43A and 43B show three-phase PWM patterns in the case of actual application of the processing of the third embodiment. FIG. 43B is a partially enlarged view of FIG. 43A. The W-phase duty is 100%. The U-phase duty pulse is shifted to be output in a direction opposed to that of the V-phase duty pulse on the basis of the bottom of the triangular wave.

According to the third embodiment, when the duty of one of three-phase PWM signals becomes larger than those of the other two phases, the former will be referred to as "maximal phase" and the latter will be referred to as "minimal phases." When two-phase currents detected at the first and second detection timing points belong to the same phase, the difference obtained by subtracting the duty of the maximal phase from the maximum duty (100%) is added to each phase duty. Further, when the maximal phase is the V-phase or the W-phase, the U-phase duty pulse is shifted to be increased/decreased in the direction opposed to the other minimal phases. Regarding the three-phase PWM signal pattern after the addition of the difference, at least one of two times of current detection is carried out at a predetermined fixed timing point. More specifically, in the processing of start D, the patterns (0) to (6) are divided into the channel patterns (0) to (6), and the foregoing processing is carried out according to the results of division. This can also improve the current detection efficiency.

The correspondence relationship between the first, second and third phases and the U-, V- and W-phases are optional.

First to third embodiments described in Japanese Patent No. 178799 may be applied to the method of determining the arrangement of phase duty pulses.

The peak of the triangular carrier wave may be a center of the period. Further, the carrier period and the minimum width of the PWM duty may appropriately be changed depending on the individual design.

The motor control device should not be limited to the application to the air conditioner but may be applied to equipment in which an electric motor is controlled by a three-phase modulation method.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A motor control device comprising:
   a current detecting element connected to a direct current side of an inverter circuit including a plurality of switching elements connected into a three-phase bridge configuration, the switching elements being configured to be on-off controlled according to a predetermined PWM signal pattern so that the inverter circuit converts direct current to three-phase alternating current, the current detecting element generating a signal corresponding to a current value;
   a rotor position determination unit configured to determine a rotor position based on phase currents of an electric motor driven by the inverter circuit;
   a PWM signal generation unit configured to generate a three-phase PWM signal pattern so that the pattern follows the rotor position;
   a current detection unit configured to detect the phase currents based on a signal generated by the current detecting element and the PWM signal pattern,
   wherein the PWM signal generation unit is configured to increase/decrease a duty in both directions of phase lag side and phase lead side with reference to any phase of the carrier-wave period regarding a first phase of the three-phase PWM signal pattern;
   wherein the PWM signal generation unit is configured to increase/decrease a duty in one of the directions of phase lag side and phase lead side with reference to any phase of the carrier-wave period regarding a second phase of the three-phase PWM signal pattern;
   wherein the PWM signal generation unit is configured to increase/decrease a duty in a direction opposite to the direction of the second phase with reference to any phase of the carrier-wave period regarding a third phase of the three-phase PWM signal pattern; and
   wherein the current detection unit has a timing point adjusting unit configured to detect two-phase currents at timing points fixed in the carrier-wave period of the PWM signal and to adjust a detection timing point so that the current is detectable at a variable timing point according to a magnitude of an output voltage supplied to the inverter circuit regarding at least one phase when the two-phase currents become undetectable at the fixed timing points.

2. The motor control device according to claim 1, wherein the timing point adjusting unit is configured to determine whether or not the current detection is based on the fixed timing points or timing points shifted from the fixed timing points, according to the three-phase PWM signal pattern.

3. The motor control device according to claim 2, wherein when the current detection unit sets a current-detectable minimum duty to a minimum width and executes subtraction of the minimum width from a maximum duty (100%) and sets a result of the subtraction to a maximum width, the timing point adjusting unit divides an output pattern of the three-phase PWM signal into following patterns (1) to (0) of first to third duties:

(1) a case where the first phase duty is less than the minimum width, and the second phase duty is larger than the third phase duty or equal to or larger than the maximum width, and the third phase duty is larger than the first phase duty;

(2) a case where the first phase duty is less than the minimum width, and the third phase duty is larger than the second phase duty or equal to or larger than the maximum width, and the second phase duty is larger than the first phase duty;

(3) a case where the second phase duty is less than the minimum width, and the first phase duty is larger than the third phase duty;

(4) a case where the second phase duty is less than the minimum width, the third phase duty is larger than the first phase duty or equal to or larger than the maximum width, and the first phase duty is larger than the second phase duty;

(5) a case where the third phase duty is less than the minimum width and the first phase duty is larger than the second phase duty;

(6) a case where the third phase duty is less than the minimum width, and the second phase duty is larger than the first phase duty or equal to or larger than the maximum width, and the third phase duty is smaller than the first phase duty;

(7) a case where the first phase duty and the second phase duty are equal to or larger than the maximum width;

(8) a case where the first phase duty and the third phase duty are equal to or larger than the maximum width;

(9) a case where the second phase duty and the third phase duty are equal to or larger than the maximum width; and (0) any case other than the cases (1) to (9), and wherein the timing point adjusting unit is configured to determine whether or not the current detection is based on the fixed timing points or timing points shifted from the fixed timing points, according to the patterns (1) to (0).

4. The motor control device according to claim 1, wherein the PWM signal generation unit is configured to subtract the duty of one phase which is minimum from the duties of the other two phases, thereby shifting the three-phase PWM signal pattern so that two-phase PWM signals are generated, and the timing point adjusting unit is configured to carry out detection of at least one of two-phase currents at a predetermined fixed timing point regarding the shifted two-phase PWM signal pattern.

5. The motor control device according to claim 4, wherein the PWM signal generation unit divides the patterns (1) to (9) into following subpatterns (0) to (10):

(1) a case where in pattern (1), a sum of one half of the first phase duty and the minimum width is larger than a difference obtained by subtracting the third phase duty from the maximum duty (100%);

(2) a case where in pattern (2), a sum of one half of the first phase duty and the minimum width is larger than a difference obtained by subtracting the second phase duty from the maximum duty;

(3) a case where in pattern (3), a sum of the second phase duty and the minimum width is larger than a difference obtained by subtracting the third phase duty from the maximum duty;

(4) a case where in pattern (4), the minimum width is larger than a difference obtained by subtracting one half of the first phase duty from the maximum width;

(5) a case where in pattern (5), a sum of the third phase duty and the minimum width is larger than a difference obtained by subtracting the second phase duty from the maximum duty;

(6) a case where in pattern (6), the minimum width is larger than a difference obtained by subtracting one half of the first phase duty from the maximum width;

(7) a case where in pattern (7), the minimum width is smaller than a sum of a difference obtained by subtracting the second phase duty from the maximum duty and the third phase duty;

(8) a case where in pattern (8), the minimum width is smaller than a sum of a difference obtained by subtracting the third phase duty from the maximum duty and the second phase duty;

(9) a case where in pattern (9), the second phase duty is larger than the third phase duty and the minimum width is larger than a sum of a difference obtained by subtracting the third phase duty from the maximum duty and the first phase duty;

(10) a case where in pattern (9), the second phase duty is equal to or smaller than the third phase duty and the minimum width is larger than a sum of a difference obtained by subtracting the second phase duty from the maximum duty and the first phase duty; and (0) any case other than the subpatterns (1) to (10), and wherein the timing point adjusting unit is configured to determine whether or not the current detection is based on the fixed timing points or timing points shifted from the fixed timing points, according to the subpatterns (1) to (10).

6. The motor control device according to claim 1, wherein when the duty of one of three-phase PWM signals is larger than the duties of the other two-phase PWM signals, so that the two-phase currents detected at the timing points adjusted by the timing point adjusting unit belong to the same phase and when the former phase with the larger duty will be referred to as a maximal phase and the latter phases will be referred to as minimal phases, the PWM signal generation unit is configured to shift the three-phase PWM signal pattern so that a difference obtained by subtracting the duty of the maximal phase from the maximum duty (100%) is added to each one of the three-phase duties, wherein when the maximal phase is the second phase or the third phase, the PWM signal generation unit is configured to shift the three-phase PWM signal pattern so that the duty of the first phase is increased/decreased in a direction opposed to the other minimal phases with reference to the phase of the carrier-wave period, and wherein the timing point adjusting unit is configured to carry out detection of at least one of the three-phase currents at a predetermined fixed timing point regarding the three-phase PWM signal pattern after occurrence of the addition.

7. The motor control device according to claim 6, wherein the PWM signal generation unit is configured to divide the patterns (1) to (6) into following subpatterns (0) to (6):

(1) a case where in the pattern (1), a difference obtained by subtracting the minimum width from the third phase duty is larger than the first phase duty and the second phase duty is less than the maximum duty;

(2) a case where in the pattern (2), a difference obtained by subtracting the minimum width from the second phase duty is larger than the first phase duty and the second phase duty is less than the maximum duty;

(3) a case where in the pattern (3), the third phase duty is less than the minimum width and the first phase duty is less than the maximum duty;

(4) a case where in the pattern (4), the first phase duty is less than the minimum width and the third phase duty is less than the maximum duty;

(5) a case where in the pattern (5), the second phase duty is less than the minimum width and the first phase duty is less than the maximum duty;

(6) a case where in the pattern (6), the first phase duty is less than the minimum width and the second phase duty is less than the maximum duty; and (0) any case other than the subpatterns (0) to (6), wherein the PWM signal generation unit is configured to determine whether or not the difference obtained by subtracting the duty of the maximal phase from the maximum duty (100%) is added to each one of the three-phase duties and whether or not an increasing/decreasing direction of the first phase duty is shifted, according to the subpatterns (0) to (6); and wherein the timing point adjusting unit is configured to determine whether or not the current detection is carried out at the predetermined fixed timing point or at a timing point obtained by shifting the fixed timing point, depending on the subpatterns (0) to (6).

8. An air conditioner comprising:

a heat pump system including a compressor, an outdoor side heat exchanger, a decompressor and an indoor side heat exchanger;

an inverter circuit configured to on-off controlling a plurality of three-phase bridge-connected switching elements according to a predetermined PWM signal pattern, thereby converting a direct current to a three-phase alternating current;

a current detecting element connected to the direct current side to generate a signal corresponding to a current value;

a rotor position determination unit configured to determine a rotor position based on phase currents of an electric motor configuring the compressor and driven by the inverter circuit;

a PWM signal generation unit configured to generate a three-phase PWM signal pattern so that the pattern follows the rotor position;

a current detection unit configured to detect the phase currents based on a signal generated by the current detecting element and the PWM signal pattern, wherein the PWM signal generation unit is configured to increase/decrease a duty in both directions of phase lag side and phase lead side with reference to any phase of the carrier-wave period regarding a first phase of the three-phase PWM signal pattern;

wherein the PWM signal generation unit is configured to increase/decrease a duty in one of the directions of phase lag side and phase lead side with reference to any phase of the carrier-wave period regarding a second phase of the three-phase PWM signal pattern;

wherein the PWM signal generation unit is configured to increase/decrease a duty in a direction opposite to the direction of the second phase with reference to any phase of the carrier-wave period regarding a third phase of the three-phase PWM signal pattern; and wherein the current detection unit has a timing point adjusting unit configured to detect two-phase currents at timing points fixed in the carrier-wave period of the PWM signal and to adjust a detection timing point so that the current is detectable at a variable timing point according to a magnitude of an output voltage supplied to the inverter circuit regarding at least one phase when the two-phase currents become undetectable at the fixed timing points.

* * * * *